US012481847B2

(12) United States Patent
Lu et al.

(10) Patent No.: US 12,481,847 B2
(45) Date of Patent: Nov. 25, 2025

(54) SENSING METHOD AND APPARATUS

(71) Applicant: HUAWEI TECHNOLOGIES CO., LTD., Shenzhen (CN)

(72) Inventors: Zhenwei Lu, Beijing (CN); Yiling Wu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/342,971

(22) Filed: Jun. 28, 2023

(65) Prior Publication Data
US 2023/0342567 A1  Oct. 26, 2023

Related U.S. Application Data

(63) Continuation of application No. PCT/CN2020/142143, filed on Dec. 31, 2020.

(51) Int. Cl.
G06K 7/10 (2006.01)
(52) U.S. Cl.
CPC ................. G06K 7/10356 (2013.01)
(58) Field of Classification Search
None
See application file for complete search history.

(56) References Cited

U.S. PATENT DOCUMENTS

2008/0224828 A1  9/2008  Ando et al.
2020/0205171 A1* 6/2020  Jiang .................. H04W 72/044

FOREIGN PATENT DOCUMENTS

| CN | 110831158 A  | 2/2020  |
| CN | 109565680 B  | 10/2020 |
| JP | 2007028119 A | 2/2007  |

OTHER PUBLICATIONS

The Global Language of Business, "EPC Radio-Frequency Identity Protocols Generation-2 UHF RFID Standard Specification for RFID Air Interface Protocol for Communications at 860 MHz-960 MHz", Release 2.1, Ratified, GS1, Jul. 2018, 157 pages.

* cited by examiner

Primary Examiner — Carlos Garcia
(74) Attorney, Agent, or Firm — Maier & Maier, PLLC

(57) ABSTRACT

A sensing communication method and an apparatus that may resolve a problem of mutual interference caused when different readers use a same resource to communicate with a tag. A network device schedules a sensing resource of the reader to the reader. The reader sends a sensing signal based on the scheduled sensing resource, and senses a sensing signal of another reader, to obtain a sensing result. The reader sends the sensing result. The reader receives information for determining a resource for communication between the reader and the tag. The reader uses the communication resource to communicate with the tag. The sensing resource is scheduled by the network device, so that communication efficiency between the reader and the tag can be improved.

20 Claims, 13 Drawing Sheets

SENSING METHOD AND APPARATUS

CROSS-REFERENCE TO RELATED APPLICATIONS

This application is a continuation of International Application No. PCT/CN2020/142143, filed on Dec. 31, 2020, the disclosure of which is hereby incorporated by reference in its entirety.

TECHNICAL FIELD

The embodiments relate to the field of communication technologies and to a sensing communication method and an apparatus.

BACKGROUND

A radio frequency identification (RFID) technology is a non-contact automatic identification technology. A reader or a reader powers a tag device by sending an excitation signal to a low-cost tag. The tag receives signaling sent by the reader, and sends signaling to the reader by using a backscatter signal, as shown in FIG. 1. In this way, the reader can identify an identifier of the tag and perform operations such as reading and writing the tag. When a plurality of readers use a same resource to separately communicate with a plurality of tags, strong interference between the readers may be caused. This further reduces performance of communication.

SUMMARY

The embodiments provide a method for communication between a reader and a tag, and an apparatus, to avoid a case in which readers with great mutual interference communicate with a tag on a same resource and improve performance of communication between the readers and the tag.

According to a first aspect, the embodiments provide a communication method. The method may be performed by a reader, or may be a chip used in the reader. The following uses an example in which the method is performed by the reader for description. A reader 1 (a first device) receives scheduling information (first information) from a first network device. The scheduling information indicates a first resource on which the reader 1 sends a first sensing signal and a second resource on which the reader 2 sends a second sensing signal. The reader sends the first sensing signal on the first resource. The reader 1 receives the second sensing signal from a reader 2 (a second device) on the second resource. The reader 1 determines a first sensing result based on the second sensing signal. The reader 1 sends the first sensing result on a third resource. The reader receives second information on a fourth resource. The reader 1 determines, based on the second information, a fifth resource for communication between the reader 1 and a tag. Then, the reader 1 communicates with the tag on the fifth resource. A network device schedules a sensing resource for a reader, so that the network device (or the reader) obtains a mutual impact between different readers, and then the network device (or the reader) may determine, based on the mutual impact between the readers, a resource for communication between the reader and a tag, to improve resource utilization.

According to a second aspect, the embodiments provide a communication method. The method may be performed by a network device, or may be a chip used in the network device. The following uses an example in which the method is performed by the network device for description. The network device sends scheduling information (first information). The scheduling information indicates a first resource on which a reader 1 sends a first sensing signal and a second resource on which a reader 2 sends a second sensing signal. The network device receives a first sensing result from the reader 1 (a first device) on a third resource. The network device receives a second sensing result from the reader 2 (a second device) on a sixth resource. The network device determines, based on the first sensing result and the second sensing result, information (second information) indicating communication between the reader 1 and a tag. The network device sends the second information to the reader 1 on a fourth resource. A network device schedules a sensing resource for a reader, so that the network device (or the reader) obtains a mutual impact between different readers, and then the network device (or the reader) may determine, based on the mutual impact between the readers, a resource for communication between the reader and a tag, to improve resource utilization.

According to a third aspect, the embodiments provide a communication method. The method may be performed by a reader, or may be a chip used in the reader. The following uses an example in which the method is performed by the reader for description. A reader 2 (a second device) receives first information from a first network device, where the first information indicates a first resource on which a reader 1 sends a first sensing signal and a second resource on which the reader 2 sends a second sensing signal. The reader 2 sends the second sensing signal on the second resource. The reader 2 receives the first sensing signal from the reader 1 (a first device) on the first resource. The reader 2 determines a second sensing result based on the first sensing signal. The reader 2 receives second information on a sixth resource, and the second information indicates a fifth resource for communication between the reader 1 and a tag. The reader 2 determines, based on the second sensing result and the second information, a seventh resource for communication between the reader 2 and the tag. The reader 2 sends information indicating the seventh resource. The reader 2 communicates with the tag on the seventh resource. A reader does not send a sensing result, but sends information indicating a resource for communication between the reader and a tag. This helps reduce signaling overheads.

According to a fourth aspect, the embodiments provide a communication method. The method may be performed by a reader, or may be a chip used in the reader. The following uses an example in which the method is performed by the reader for description. A reader 2 receives first information from a first network device, where the first information indicates a first resource and a second resource. The reader 2 receives, on the first resource, a first sensing signal and second information from a reader 1. The second information indicates a fifth resource for communication between the reader 1 and a tag. The reader 2 determines a second sensing result based on the first sensing signal. The reader 2 determines, based on the second sensing result and the second information, a seventh resource for communication between the reader 2 and the tag. The reader 2 sends, on the second resource, a second sensing signal and information indicating the seventh resource. The reader 2 communicates with the tag on the seventh resource. A reader sends, by using one resource, a sensing signal and a resource indicating communication between the reader and a tag, so that a latency can be reduced.

In the first aspect to the fourth aspect, in a possible implementation, the reader 1 sends the first sensing result in the following manner:

The reader 1 sends the first sensing result to the first network device, or the reader 1 (the first device) sends the first sensing result to the reader 2 (the second device). When the reader 1 sends the first sensing result to the first network device, the reader 1 receives the second information from the first network device. By using receiving a sensing result sent by a reader, the network device can schedule a resource for communication between each reader and a tag, to improve performance of communication between the reader and the tag. In the case where the reader 1 sends the first sensing result to the reader 2, the reader 1 receives the second information from the reader 2, and the second information includes the second sensing result of the reader 2. The reader 1 determines the fifth resource based on the second sensing result and the first sensing result. A reader sends a sensing result to another reader. The reader determines, according to a predefined rule, based on the received sensing result of the another reader, a resource that is to be occupied by the reader and that is for communication between the reader and a tag, to reduce signaling overheads between the readers and the base station.

In the first aspect to the fourth aspect, in a possible implementation, the resource (the third resource) on which the reader 1 sends the first sensing result is associated with the resource (the first resource) on which the reader 1 sends the sensing signal. There is an association relationship between a resource on which a reader sends a sensing result and a resource on which the reader previously sends a sensing signal, so that overheads of a network device can be reduced.

In the first aspect to the fourth aspect, in a possible implementation, the resource (the fourth resource) on which the reader 1 receives the second information is associated with the resource (the second resource) on which the reader 1 receives the second sensing signal. There is an association relationship between a resource on which a reader receives second information and a resource on which the reader previously receives a sensing signal, so that overheads of a network device can be reduced.

In the first aspect to the fourth aspect, in a possible implementation, the sensing result includes a measured value of the second sensing signal by the reader 1. Alternatively, the sensing result includes a comparison result between the measured value of the second sensing signal by the reader 1 and a threshold. A reader sends a measured value, and a receiving side may obtain more information. This helps the receiving side determine a resource for communication between the reader and a tag. The reader sends a comparison result between a measured value and a threshold, so that overheads for sending the measured value can be reduced.

In the first aspect to the fourth aspect, in a possible implementation, the first resource, the second resource, the third resource, the fourth resource, and the fifth resource are time domain resources.

In the first aspect to the fourth aspect, in a possible implementation, the first information indicates at least one of the following parameters:
  a start location of a first resource set, where the first resource set includes the first resource and the second resource,
  a quantity of resource elements included in a first resource set,
  an index of the first resource in a first resource set, and
  an index of the second resource in a first resource set.

In the first aspect to the fourth aspect, in a possible implementation, the fifth resource belongs to a second resource set. The second information indicates at least one of the following parameters:
  a start location of the second resource set,
  a quantity of resource elements included in the second resource set, and
  an index of the fifth resource in the second resource set.

In the first aspect to the fourth aspect, in a possible implementation, the sensing signal is a reference signal.

In the first aspect and the second aspect, in a possible implementation, the second information indicates an identifier (an identifier of the reader) of one or more scheduled devices communicating with the tag. A scheduled reader and an unscheduled reader can learn which reader is scheduled. The unscheduled reader may determine, in a subsequent sensing process, whether to send a sensing signal and a resource on which the reader sends the sensing signal, without requiring a base station to schedule the resource on which the reader sends the sensing signal, to reduce signaling overheads and a scheduling latency between the base station and the reader.

In the first aspect to the fourth aspect, in a possible implementation, the first information is carried in at least one of the following signaling:
  unicast signaling, multicast signaling, and broadcast signaling.

The second information is carried in at least one of the following signaling:
  unicast signaling, multicast signaling, and broadcast signaling. In other words, the first information and the second information may be sent in a unicast, multicast, or broadcast manner. Alternatively, the first information and the second information may be sent in any combination of unicast, multicast, or broadcast.

In the fourth aspect, in a possible implementation, the first sensing result includes the measured value of the second sensing signal. When the measured value is greater than or equal to a first threshold, the fifth resource and the seventh resource do not overlap. When the measured value is less than the first threshold, the fifth resource is the same as the seventh resource. Based on a mutual impact between readers, it is determined whether to occupy a same resource. This can improve resource utilization.

According to a fifth aspect, a communication apparatus is provided. The communication apparatus has a function of implementing behavior in the method instance of the first aspect. The function may be implemented by hardware, or may be implemented by hardware executing corresponding software. The hardware or the software includes one or more modules corresponding to the foregoing function. In a possible implementation, the communication apparatus includes a transceiver unit, configured to receive first information from a first network device, where the first information indicates a first resource and a second resource. The transceiver unit is further configured to send a first sensing signal on the first resource, and receive a second sensing signal from a second device on the second resource. The communication apparatus further includes a processing unit, configured to determine a first sensing result based on the second sensing signal. The transceiver unit is further configured to send the first sensing result on a third resource, and receive second information on a fourth resource. The processing unit is further configured to determine a fifth resource based on the second information. The transceiver unit is further configured to communicate with a tag on the fifth resource. The units may perform corresponding functions in the method example in the first aspect. For details, refer to detailed descriptions in the method example. Details are not described herein again.

According to a sixth aspect, a communication apparatus is provided, and the communication apparatus has a function of implementing behavior in the method instance of the second aspect. The function may be implemented by hardware, or may be implemented by hardware executing corresponding software. The hardware or the software includes one or more modules corresponding to the foregoing function. In a possible implementation, the communication apparatus includes a transceiver unit, configured to send first information. The first information indicates a first resource and a second resource, the first resource is used by a first device to send a first sensing signal, and the second resource is used by the second device to send a second sensing signal. The transceiver unit is further configured to receive, on a third resource, a first sensing result from the first device, and receive, on a sixth resource, a second sensing result from a second device. The communication apparatus further includes a processing unit, configured to determine second information based on the first sensing result and the second sensing result. The second information indicates a fifth resource for communication between the first device and a tag. The transceiver unit is further configured to send the second information to the first device on a fourth resource. The units may perform corresponding functions in the method example in the second aspect. For details, refer to detailed descriptions in the method example. Details are not described herein again.

According to a seventh aspect, a communication apparatus is provided, and the communication apparatus has a function of implementing behavior in the method instance of the third aspect. The function may be implemented by hardware, or may be implemented by hardware executing corresponding software. The hardware or the software includes one or more modules corresponding to the foregoing function. In a possible implementation, the communication apparatus includes a transceiver unit, configured to receive first information from a first network device, where the first information indicates a first resource and a second resource. The transceiver unit is further configured to send a second sensing signal on the second resource, and receive a first sensing signal from a reader 1 (a first device) on the first resource. The communication apparatus further includes a processing unit, configured to determine a second sensing result based on the first sensing signal. The transceiver unit is further configured to receive second information on a sixth resource, where the second information indicates a fifth resource for communication between the reader 1 and a tag. The processing unit is further configured to determine a seventh resource based on the second sensing result and the second information. The transceiver unit is further configured to send information indicating the seventh resource. The transceiver unit is further configured to communicate with the tag on the seventh resource. The units may perform corresponding functions in the method example in the third aspect. For details, refer to detailed descriptions in the method example. Details are not described herein again.

According to an eighth aspect, a communication apparatus is provided. The communication apparatus has a function of implementing behavior in the method instance of the fourth aspect. The function may be implemented by hardware, or may be implemented by hardware executing corresponding software. The hardware or the software includes one or more modules corresponding to the foregoing function. In a possible implementation, the communication apparatus includes a transceiver unit, configured to receive first information from a first network device, where the first information indicates a first resource and a second resource. The transceiver unit is further configured to receive, on the first resource, a first sensing signal and second information from a reader 1, where the second information indicates a fifth resource for communication between the reader 1 and a tag. The communication apparatus further includes a processing unit, configured to determine a second sensing result based on the first sensing signal. The processing unit is further configured to determine a seventh resource based on the second sensing result and the second information. The transceiver unit is further configured to send, on the second resource, a second sensing signal and information indicating the seventh resource. The transceiver unit is further configured to communicate with the tag on the seventh resource.

According to a ninth aspect, a communication apparatus is provided. The communication apparatus may be the reader in the foregoing method embodiments, or a chip disposed in the reader. The communication apparatus includes a communication interface and a processor, and optionally, further includes a memory. The memory is configured to store a computer program or instructions. The processor is coupled to the memory and a communication interface. When the processor executes the computer program or the instructions, the reader is enabled to perform the method performed by the reader in the foregoing method embodiments.

According to a tenth aspect, a communication apparatus is provided. The communication apparatus may be the network device in the foregoing method embodiments, or a chip disposed in the network device. The communication apparatus includes a communication interface and a processor, and optionally, further includes a memory. The memory is configured to store a computer program or instructions. The processor is coupled to the memory and a communication interface. When the processor executes the computer program or the instructions, the communication apparatus is enabled to perform the method performed by the network device in the foregoing method embodiments.

According to an eleventh aspect, a computer program product is provided, and the computer program product includes: computer program code; and when the computer program code is run, the method performed by the reader in the foregoing aspects is enabled to be performed.

According to a twelfth aspect, a computer program product is provided, and the computer program product includes: computer program code; and when the computer program code is run, the method performed by the network device in the foregoing aspects is performed.

According to a thirteenth aspect, the embodiments provide a chip system. The chip system includes a processor, configured to implement functions of the reader in the methods in the foregoing aspects. In a possible implementation, the chip system further includes a memory, configured to store program instructions and/or data. The chip system may include a chip, or may include the chip and another discrete component.

According to a fourteenth aspect, the embodiments provide a chip system. The chip system includes a processor, configured to implement functions of the network device in the methods in the foregoing aspects. In a possible implementation, the chip system further includes a memory, configured to store program instructions and/or data. The chip system may include a chip, or may include the chip and another discrete component.

According to a fifteenth aspect, the embodiments provide a computer-readable storage medium. The computer-readable storage medium stores a computer program. When the computer program is run, the method performed by the reader in the foregoing aspects is implemented.

According to a sixteenth aspect, the embodiments provide a computer-readable storage medium. The computer-readable storage medium stores a computer program. When the computer program is run, the method performed by the network device in the foregoing aspects is implemented.

According to a seventeenth aspect, the embodiments provide a communication system. The communication system includes a network device and a reader. The network device implements the method performed by the network device in the foregoing aspects. The reader implements the method performed by the reader in the foregoing aspects.

DETAILED DESCRIPTION OF EMBODIMENTS

Figure 1:
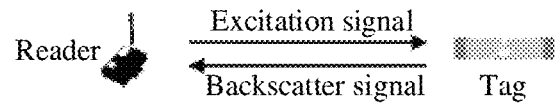
FIG. 1 is a possible schematic diagram of communication between a reader and a tag according to an embodiment.

For ease of understanding, some concepts related to the embodiments are described for reference. The concepts are as follows.

A receives information from B: A may directly receive the information sent by B to A. Alternatively, A may receive, by using an intermediate device C, the information sent by B. That is, B sends the information to C, and C sends the information to A.

Unicast: The unicast refers to point-to-point communication between a transmitting end (such as a network device) and a receiving end (such as a reader). For example, a destination of information sent by a network device is one reader instead of another reader.

Multicast: The multicast, or multicast, refers to one-to-many communication between a transmitting end (such as a network device) and a plurality of receiving ends (such as readers). For example, destinations of information sent by a network device are a plurality of readers or a group of readers.

Broadcast: The broadcast refers to one-to-many communication between a transmitting end (such as a network device) and all receiving ends (such as readers) belonging to the transmitting end. For example, destinations of information sent by a network device are all readers currently belonging to the network device.

Time-frequency resource: The time-frequency resource is classified into an orthogonal frequency division multiplexing (OFDM) symbol or a single carrier-frequency division multiplexing access (SC-FDMA) symbol in a time dimension, and a subcarrier in a frequency domain dimension, which are included in a time-frequency resource grid. A smallest resource granularity in the grid is referred to as a resource element (RE), and represents a time-frequency grid point that includes a time domain symbol in time domain and a subcarrier in frequency domain. Subcarrier spacing is 15 kHz, 30 kHz, 60 kHz, or the like. A physical resource block (PRB) is a basic unit of frequency domain resource scheduling, and one physical resource block includes 12 frequency domain subcarriers. A slot is a basic unit of a time domain resource. One slot generally includes 14 time domain symbols, or one slot generally includes 7 time domain symbols. A subframe is also a basic unit of a time domain resource, and is fixed at 1 ms. For subcarrier spacing of 15 kHz, each subframe includes 14 time domain symbols.

Reference signal: The reference signal may be a sequence known to a transceiver. The reference signal is used by a receiving side to demodulate data (for example, a demodulation reference signal (DMRS), or a cell-specific reference signal (CRS)), or the receiving side performs measurement (for example, a sounding reference signal (SRS), or a channel state information reference signal (CSI-RS)).

Demodulation reference signal: The demodulation reference signal refers to a signal that is inserted into a data channel and that is transmitted with the data channel, or a signal that is inserted into a control channel and that is transmitted with the control channel. The signal is used by a receiving side to estimate a physical channel condition, and then demodulate transmission information.

Time domain resource element: One time domain resource element may be one or more subframes, may be one or more slots, or may be one or more time domain symbols.

Frequency domain resource element: One frequency domain resource element may be one or more PRBs. One frequency domain resource element may alternatively be one or more REs.

Resource element: The resource element includes one time domain resource element and one frequency domain resource element.

Indication: A indicates B, which may be an explicit indication or an implicit indication.

Explicit indication: A directly indicates B, for example, A directly indicates information about B.

Implicit indication: A indirectly indicates B, for example, A does not directly indicate information about B, but indicates other information, but may determine B by using the other information.

Reflection: The reflection is also known as backscatter, or backscatter (backscatter).

Network device: The network device may be an access network device. The access network device may also be referred to as a radio access network (RAN) device, and is a device that provides a wireless communication function for a terminal device. For example, the access network device includes, but is not limited to: a next generation NodeB (gNB) in 5G, an evolved NodeB (eNB), a baseband unit (BBU), a transmission reception point (TRP), a transmission point (TP), a base station in a future mobile communication system, or an access point in a Wi-Fi system. Alternatively, the access network device may be a radio controller, a central unit (CU), and/or a distributed unit (DU) in a cloud radio access network (CRAN) scenario. Alternatively, the network device may be a relay station, a vehicle-mounted device, a network device in a future evolved network, or the like.

Terminal device: The terminal device may be referred to as a terminal for short, or also referred to as user equipment (UE), and is a device having a wireless transceiver function. The terminal device may be deployed on land, including indoor, outdoor, handheld, or vehicle-mounted. The terminal device can also be deployed on the water surface (such as a ship). The terminal device can also be deployed in the air. (for example, an aircraft, a drone, a balloon, or a satellite). The terminal device may be a mobile phone, a tablet computer, a computer having a wireless transceiver function, a virtual reality terminal device, an augmented reality terminal device, a wireless terminal device in industrial control, a wireless terminal device in self-driving, a wireless terminal device in telemedicine, a wireless terminal device in a smart grid, a wireless terminal device in transportation security, a wireless terminal device in a smart city, or a wireless terminal device in a smart home. Alternatively, the terminal device may be fixed or mobile.

Reader: The reader is a device communicating with a tag, sends an excitation signal to the tag, and/or sends RFID signaling to the tag or receives RFID signaling from the tag. The reader may be a network device or a terminal device.

RFID: The RFID is a non-contact automatic identification technology. A basic principle of the RFID is to use a transmission characteristic of radar reflection or a spatial coupling of radio frequency signals, to implement automatic identification of an identified object. A reader communicates wirelessly with an RFID electronic tag through an antenna, and can read or write tag identification code and memory data. The tag receives a signal sent by the reader, and is configured to drive an internal circuit to perform operation processing such as encoding, decoding, modulation, and demodulation, reflect the signal sent by the reader, and modulate information to be transmitted on the reflected signal to send signaling to the reader. The tag can be classified into a passive, active, or semi-passive (or semi-active) tag. The passive tag has no power supply, and internal processing and signal reflection depend on an excitation signal of the reader. The active tag has a power supply inside, and internal processing and signal reflection may not depend on the excitation signal of the reader. The semi-passive tag has a power supply inside, and internal processing and signal reflection can be performed by using excitation signals of the power supply and the reader.

Inventory: A reader performs RFID communication with a tag in a coverage area, obtains identifier (ID) of the tag, and learns which tags (where the tags are attached to goods) in the coverage area, so that the goods can be counted (stock-taking) in a scenario such as a shop or a warehouse.

Figure 2:
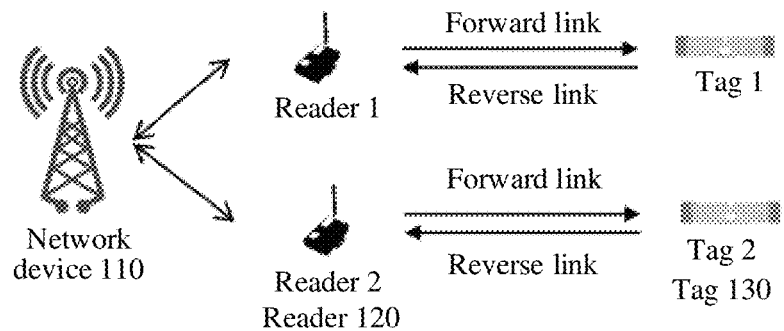
FIG. 2 is a schematic diagram of a possible communication architecture according to an embodiment.

FIG. 2 is a schematic diagram of a possible network architecture to which an embodiment is applicable, including a network device 110; including a reader 120, where the reader 120 includes readers 1 and 2; and including a tag 130, where the tag 130 includes tags 1 and 2. Communication between the reader 120 and the tag is classified into a forward link and a reverse link. A link on which the reader 120 sends data to the tag is the forward link. A link on which the reader 120 receives data from the tag is the reverse link.

The reader 120 may be connected to the tag 130 in a wireless manner, and the reader 120 may be connected to the network device 110 in a wired or wireless manner.

It should be noted that, in the network architecture shown in FIG. 2, the tag 120 may be fixed at a location, or may be movable. This is not limited. The network architecture shown in FIG. 2 may further include another network device, such as a wireless relay device and a wireless backhaul device. This is not limited. In the architecture shown in FIG. 2, quantities of network devices, readers, and tags are not limited.

The solutions in the embodiments are applied to various communication systems, for example, a long term evolution (LTE) system, a 5th generation (5G) mobile communication system, and a future mobile communication system.

Figure 3:
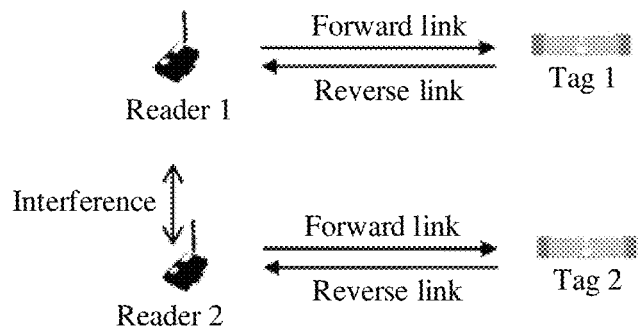
FIG. 3 is a schematic diagram of mutual interference between communication between two readers and a tag according to an embodiment.

As shown in FIG. 3, the reader 1 performs RFID communication with the tag 1, and the reader 2 performs RFID communication with the tag 2. The reader 1 and the reader 2 respectively and independently communicate with the tag 1 and the tag 2 without coordination. The reader 1 and the reader 2 send signals at the same time. The readers 1 and 2 are close to each other, and sending the signals at the same time causes great interference to each other. This affects normal RFID communication and reduces a coverage area of the reader.

Figure 4:
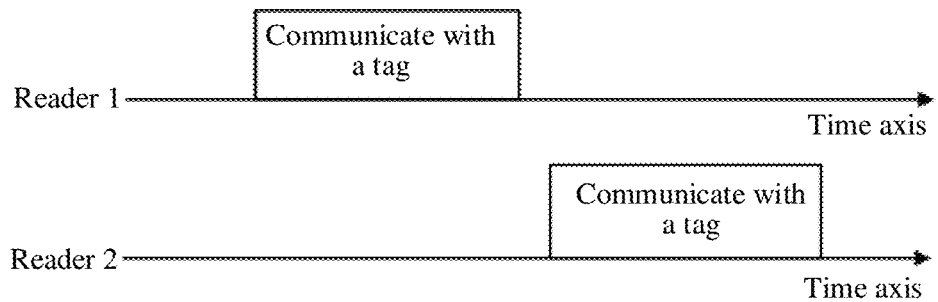
FIG. 4 is a schematic diagram of communication between two readers and a tag through time division multiplexing according to an embodiment.

When a network device coordinates RFID communication between a plurality of readers and a tag, when the reader performs the RFID communication with the tag is scheduled by the network device. As shown in FIG. 4, to avoid interference between the readers, the network device schedules time division multiplexing between the readers. FIG. 4 shows results of the network device scheduling the readers. In FIG. 4, the network device schedules a reader 1 for RFID communication with the tag first, and then schedules a reader 2 for RFID communication with the tag thereafter. The network device schedules full time division multiplexing between the readers. This can avoid interference between the readers. However, some readers can send signals at the same time without causing interference, and this causes insufficient utilization of time domain resources, and reduces communication efficiency between the readers and the tag.

Figure 5:
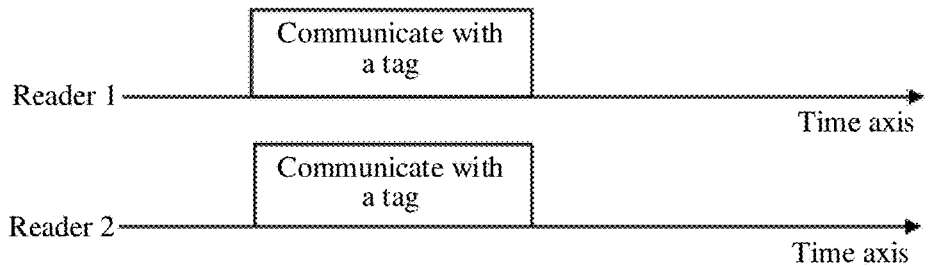
FIG. 5 is a schematic diagram of communication between two readers and a tag in a same time domain element according to an embodiment.

To make full use of time domain resources, the network device schedules the readers to send signals at the same time (or sending time may overlap). As shown in FIG. 5, the network device schedules the reader 1 and the reader 2 to send signals at the same time. In this case, the network device cannot accurately learn which readers can send signals at the same time. Therefore, great interference may be caused between a plurality of readers scheduled by the network device to send signals at the same time.

In the following embodiments, a resource may be a time domain resource, a frequency domain resource, a code domain resource, or a space domain resource. Alternatively, the resource may be any combination of a time domain resource, a frequency domain resource, a code domain resource, or a space domain resource. For example, the resource is a time-frequency resource, or the resource is a time-frequency resource and a code domain resource.

Figure 6:
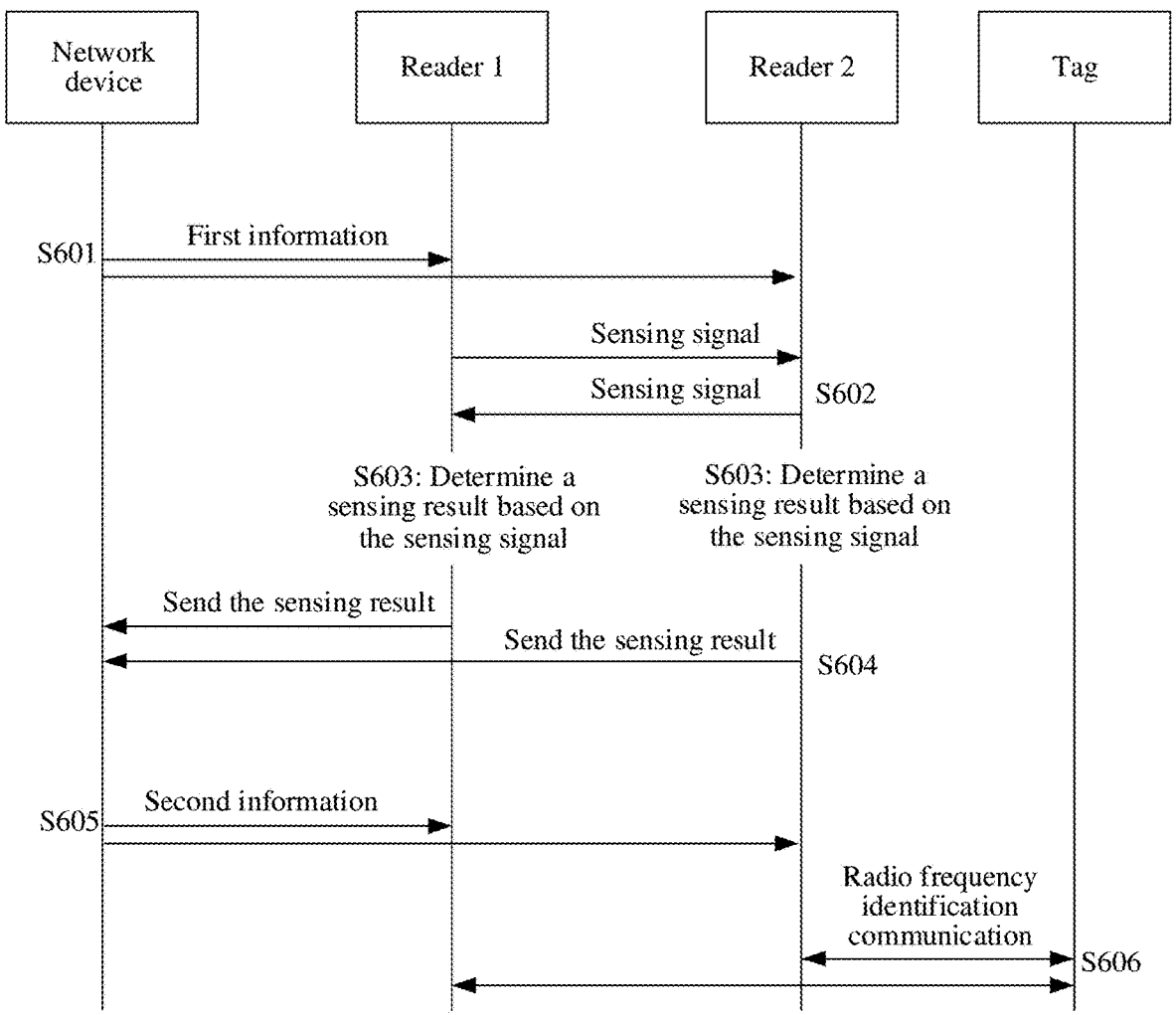
FIG. 6 is a schematic diagram of a sensing method according to an embodiment.

Based on the network architecture provided in FIG. 2, the following describes a communication scenario between a reader and a tag. In this application scenario, a network device may be the network device 110 in FIG. 2, the reader may be the reader 120 in FIG. 2, and the tag may be the tag 130 in FIG. 2. FIG. 6 shows a schematic diagram of communication between the reader and the tag. In FIG. 6, a reader 1 may be a first device. A reader 2 may be a second device. There are a plurality of tags in FIG. 6. That the readers 1 and 2 communicate with tags generally means that the readers 1 and 2 respectively communicate with different tags. For example, the reader 1 communicates with a tag 1. The reader 2 communicates with a tag 2. A quantity of readers in FIG. 6 is not limited to two, and readers 3 and 4 may alternatively be included. As shown in FIG. 6, a communication process may include the following steps.

S601: The network device sends first information to the reader.

S602: The reader sends a sensing signal and receives a sensing signal from another reader.

S603: The reader determines a sensing result based on the received sensing signal. The reader measures the sensing signal sent by the another reader, for example, may measure reference signal received power (RSRP), a received signal strength indicator (RSSI), and a signal to interference plus noise ratio (SINR) of the signal. For example, the readers 1 and 2 respectively measure sensing signals of each other, and obtain respective sensing results. The sensing result may include a measured value of the sensing signal. The sensing result may also include a comparison result between the measured value and a threshold. If the measured value is greater than (or greater than or equal to, less than, or less than or equal to) a preset threshold value, the comparison result is set to 1 (or 0). Otherwise, the comparison result is set to 0 (or 1). The sensing result may alternatively include a comparison result of a plurality of time domain resource elements. For example, the sensing result is indicated by using a bitmap (bitmap).

S604: The reader sends the sensing result.

S605: The network device sends second information to the reader. The second information indicates a resource for communication between the reader and the tag.

S606: The reader communicates with the tag.

The network device schedules a sensing resource for the reader, so that the network device obtains a mutual impact between different readers, and then the network device may determine, based on the mutual impact between the readers, the resource for communication between the reader and the tag, to improve resource utilization.

Steps S601 to S606 are further described below.

In S601 in FIG. 6, the network device sends the first information to the reader 1 and the reader 2. That is, the reader receives the first information from the network device.

In a possible manner, the first information indicates at least one of the following parameters:

a start location of a first resource set, where the first resource set includes a first resource and a second resource;

a quantity of resource elements included in a first resource set;

an index of a first resource in a first resource set; or an index of a second resource in a first resource set. The first resource set is a resource set used by the reader to send the sensing signal.

The first information is used to schedule the sensing signal. The first information indicates the first resource and the second resource. The first resource is used by the reader 1 to send a first sensing signal, and the second resource is used by the reader 2 to send a second sensing signal.

The network device may send the first message to the reader (for example, the reader 1 or the reader 2) in a multicast or broadcast manner. Alternatively, the network device may separately send the first information to a plurality of readers (for example, the reader 1 and the reader 2) in a unicast manner.

In a possible manner, the network device separately sends the first information to the readers in a unicast manner. The first information indicates a quantity of resource elements in a sensing resource set (the first resource set), a start location of the sensing resource set, or an index of a resource element, in the sensing resource set, that is of the reader and that is used to send the sensing signal. For example, the first information sent by the base station to the reader 1 indicates a start location of the sensing resource set, and indicates that a total of three units (units) of sensing resources are allocated (where a quantity of resource elements in the resource set is 3), and that the resource element whose index is 1 is allocated to the reader 1. (where an index of the resource element, in the sensing resource set, that is of the reader and that is used to send the sensing signal is 1). The first information sent by the base station to the reader 2 indicates a start location of the sensing resource set, and indicates that a total of three resource elements are allocated, and that the resource element whose index is 2 is allocated to the reader 2. The first information (not shown in FIG. 6) sent by the base station to a reader 3 indicates a start location of the sensing resource set, and indicates that a total of three resource elements are allocated, and that the resource whose index is 3 is allocated to the reader 3.

An example in which the resource is a time domain resource is used. For example, the network device notifies the readers 1 to 3 of a start location of the first resource set by using the first information. For example, the first information indicates an offset between a time domain location of the first information and the start location of the first resource set. For example, one time domain resource element is a slot, and the network device sends the first message in a $k^{th}$ slot. The network device notifies, by using signaling, the readers 1 to 3, that the start location of the first resource set (the resource set of the sensing signal) is a $(k+4)^{th}$ slot. Optionally, the offset between the time domain location of the first information and the start location of the first resource set may be defined in a predefined manner. For example, the network device sends the first message in a $k^{th}$ slot, and a $(k+3)^{th}$ slot is predefined as the start location of the first resource set.

After receiving the corresponding first information, the readers 1 to 3 may learn, based on a start location of the sensing resource set, where a sensing resource starts, learn a location of each sensing resource based on a total quantity of resource elements in the sensing resource set (assuming a structure, a size, or the like of each sensing resource is fixed), and learn, based on indexes of the resource elements, locations of resources allocated to the readers, and may further learn a location of a resource allocated to another reader. The reader 1 is used as an example. The reader 1 receives the first message to the reader 1. The first message indicates the start location of the sensing resource set, and indicates that a quantity of elements in the sensing resource set is 3. In addition, a resource element whose index is 1 is a resource used by the reader 1 to send the sensing signal. The reader 1 may obtain that resource elements whose indexes are 2 and 3 are resources used by other readers to send sensing signals. The reader 1 measures the sensing signals sent by the other readers on the resource elements whose indexes are 2 and 3.

In a possible manner, the network device sends the first information in a multicast or broadcast manner. The first information indicates a start location of a sensing resource set, and respective indexes of resource elements, in the sensing resource set, that are of a plurality of readers and that are used to send sensing signals. For example, the first information indicates the start location of the sensing resource set, a resource whose index is 1 is allocated to the sensing signal sent by the reader 1, a resource whose index is 2 is allocated to the reader 2, and a resource whose index is 3 is allocated to the reader 3. After receiving the control information, the reader may learn, based on the start location of the sensing resource set, where the resource starts, and may learn, based on an index of each resource element, a location of a resource allocated to the reader and a location of a resource allocated to another reader.

In a possible manner, a time domain relationship between a start location (assuming the start location is a time domain start location) of the sensing resource set and an end location of the first information is fixed. For example, if the first information ends in an $n^{th}$ slot, the sensing resource set starts from an $(n+4)^{th}$ slot. The resource set fixedly includes three resource elements, and a size of each resource element (or each resource) is fixed (for example, a size of each resource element is one slot). In this case, the start location of the sensing resource set, a quantity of resource elements in the resource set, and a size of each resource element do not need to be indicated by using content of the first information. The first information sent to the reader 1 indicates a resource index allocated to the reader 1 in the resource set. When sizes of the first resource and the second resource are fixed values, for example, one slot is fixed, no additional indication is required. However, if the sizes of the first resource and the second resource may have a plurality of value sets, the sizes of the first resource and the second resource may be indicated by using the first information. For example, the sizes of the first resource and the second resource may be seven symbols, one slot, or two slots. The sizes of the first resource and the second resource may be indicated by using the first information.

For example, the resource is a time domain resource. Table 1 shows resources allocated by the network device to different readers.

TABLE 1

Sensing time domain resources allocated to readers

| Time domain index | Reader |
|---|---|
| 1 | 1 |
| 2 | 2 |
| 3 | 3 |

That the resource is a time-frequency resource is used as an example. There are three units of time domain resources in time domain, and there are two units of frequency domain resources in frequency domain. One time domain resource element and one frequency domain resource element are included in one resource element, and there are six resource elements in total. In an example, indexes of two frequency domain resource elements are indexed in ascending order of frequencies, that is, an index of a frequency domain resource element with a low frequency is small. The three time domain resource elements are indexed in ascending order of time domain locations. It is assumed that a predefined relationship between a resource element index, and a time domain index and a frequency domain index is: Resource elements are indexed in ascending order of frequency domain first and then time domain, as shown in Table 2.

TABLE 2

Sensing time-frequency resources allocated to readers

| Resource index | Time domain index | Frequency domain index | Reader |
|---|---|---|---|
| 1 | 1 | 1 | 1 |
| 2 | 1 | 2 | 2 |
| 3 | 2 | 1 | 2 |
| 4 | 2 | 2 | 3 |
| 5 | 3 | 1 | 3 |
| 6 | 3 | 2 | 1 |

A unicast manner is used as an example. The first information sent by the network device to the reader 1 indicates a start location of a sensing time domain resource, and locations of allocated two frequency domain resource elements, and indicates that a total of three time domain sensing resource elements are allocated, and that time-frequency resources whose resource indexes are 1 and 6 allocated to the reader 1 are for sending a sensing signal. The first information sent to the reader 2 indicates a start location of a sensing time domain resource, and locations of allocated two frequency domain resource elements, and indicates that a total of three time domain sensing resource elements are allocated, and that time-frequency resources whose resource indexes are 2 and 3 allocated to the reader 2 are for sending a sensing signal. The first information sent to the reader 3 indicates a start location of a sensing time domain resource, and locations of allocated two frequency domain resource elements, and indicates that a total of three time domain sensing resource elements are allocated, and that time-frequency resources whose resource indexes are 4 and 5 allocated to the reader 2 are for sending a sensing signal.

In S602, Table 1 is used as an example. Each reader sends a sensing signal of each reader on a time domain resource allocated to each reader. For example, the reader 1 sends the first sensing signal on the first resource (a resource element whose time domain resource index is 1).

In S603, the reader 1 is used as an example. The reader 1 receives the sensing signal (the second sensing signal) from the reader 2, and determines a first sensing result based on the second sensing signal. For example, the first sensing result includes RSRP of the received sensing signal that is of the reader 2 and that is measured by the reader 1.

In S604, the reader sends the sensing result to the network device. In FIG. 6, the readers 1 and 2 respectively send sensing results to the network device. For example, the reader 1 sends the first sensing result on a third resource. The reader sends the measured value, and a receiving side may obtain more information. This helps the receiving side determine a resource for communication between the reader and the tag. The reader sends the comparison result between the measured value and the threshold, so that overheads for sending the sensing result can be reduced.

In S605, the network device sends the second information to the reader. The second information indicates a resource (a fifth resource) for communication between the reader and the tag. For example, the network device determines, based on the received sensing result, resources for communication between each reader and the tag, and respectively sends the determined resources to the readers. In a possible manner, the network device sequentially determines resources of the readers in descending order based on sensing results of the readers and priorities of the readers. For example, the $1^{st}$ resource is allocated to a reader with a highest priority. Then, it is determined whether a reader with the second priority can allocate the same resource as that of the reader with the highest priority. If yes, the $1^{st}$ resource is also allocated to the reader with the second priority. If no, the $2^{nd}$ resource is allocated to the reader with the second priority. The rest is deduced by analogy. Details are not described. In another possible manner, after the network device tries various resource allocation manners, the network device selects a manner, from the manners, in which a minimum total quantity of resources are occupied, and the network device uses the manner as a final resource allocation result. In FIG. 6, the network device determines, based on the sensing results of the reader 1 and the reader 2, a resource for communication between the reader 1 and the reader 2, and the tag. For example, the network device determines a time domain resource 1 for communication between the reader 1 and the tag, and a time domain resource 2 for communication between the reader 2 and the tag. The network device sends, to the reader 1 by using a fourth resource, the second information indicating the time domain resource 1. Correspondingly, the reader 1 receives the second information on the fourth resource. The network device sends, to the reader 2, the second information indicating the time domain resource 2. By receiving the sensing result sent by the reader, the network device can schedule a resource (the fifth resource) for communication between each reader and the tag, to improve performance of communication between the reader and the tag.

In an example, the second information indicates at least one of the following parameters:
  a start location of a second resource set,
  a quantity of resource elements included in the second resource set, or
  an index of a resource for communication between the reader and the tag in the second resource set.

The fifth resource is a resource for communication between the reader and the tag. The fifth resource belongs to the second resource set. There may be a plurality of indexes, in the second resource set, of resources for communication between the readers and the tag, for example, an index 1 of a resource (the fifth resource) for communication between the reader 1 and the tag in the second resource set, and an index 2 of a resource for communication between the reader 2 and the tag in the second resource set.

In an example, the network device separately sends the second information to each scheduled reader in a unicast manner. In a possible manner, the second information sent by the network device to the reader 1 indicates a start location of the second resource set for communication between the reader and the tag, and indicates that the second resource set includes two resource elements, and that the resource element whose index is 1 is allocated to the reader 1. The second information sent by the base station to the reader 2 indicates the start location of the second resource set for communication between the reader and the tag, and indicates that the second resource set includes two resource elements, and that the resource element whose index is 2 is allocated to the reader 2. The second information sent by the base station to the reader 3 indicates the start location of the second resource set for communication between the reader and the tag, and indicates that the second resource set includes two resource elements, and that the resource element whose index is 2 is allocated to the reader 3.

In an example, the network device sends the second information to the reader in a multicast or broadcast manner, to indicate a resource for communication between the reader and the tag. For example, the network device multicasts or broadcasts the second information to the readers 1 to 3. The second information indicates the start location of the second resource set for communication between the readers and the tag, and indicates that the second resource set includes two resource elements, and that the resource element whose index is 1 is allocated to the reader 1 and resource elements whose indexes are 2 are allocated to the readers 2 and 3.

In an example, a time domain relationship between the start location of the second resource set and an end location of the second information is fixed. For example, if the second information ends in an $n^{th}$ slot, the second resource set starts from an $(n+4)^{th}$ slot. The second resource set fixedly includes two resource elements, and a size of each resource element (or each resource) is fixed (for example, a size of each resource element is 2 s). In this case, the second information indicates a resource index allocated to the scheduled reader in the second resource set, and does not need to indicate the start location of the second resource set and a quantity of resource elements included in the second resource set.

In S606, the reader (for example, the reader 1) determines the fifth resource based on the received second information, and communicates with the tag by using the fifth resource. The communication between the reader and the tag may be inventory communication. Optionally, another operation by the reader on the tag may be included, such as reading and writing memory.

The first information and the second information may be physical layer control information, for example, downlink control information (DCI). The first information and the second information may be medium access control (MAC) information, for example, a MAC control element (CE). The first information and the second information may be radio resource control (RRC) information, for example, RRC dedicated or common signaling, or a field in the RRC dedicated or common signaling. The first information may be sent by using one or more pieces of signaling. For example, a resource index allocated to the reader is notified in a unicast manner (for example, by using the DCI). The start location, the total quantity of resources, and the like of the first resource set may be notified in a multicast or broadcast manner (for example, by using the RRC common signaling). Alternatively, the second information may be sent by using one or more pieces of signaling. For example, the resource index that is allocated to the reader and that is for communication between the reader and the tag is notified in a unicast manner (for example, by using the DCI). The start location, the total quantity of resources, and the like of the second resource set may be notified in a multicast or broadcast manner (for example, by using the RRC common signaling). That is, the first information is carried in at least one of the following signaling: unicast signaling, multicast signaling, and broadcast signaling. The second information is carried in at least one of the following signaling: unicast signaling, multicast signaling, and broadcast signaling.

In an example, the first resource, the second resource, the third resource, the fourth resource, and the fifth resource are time domain resources.

Figure 7:
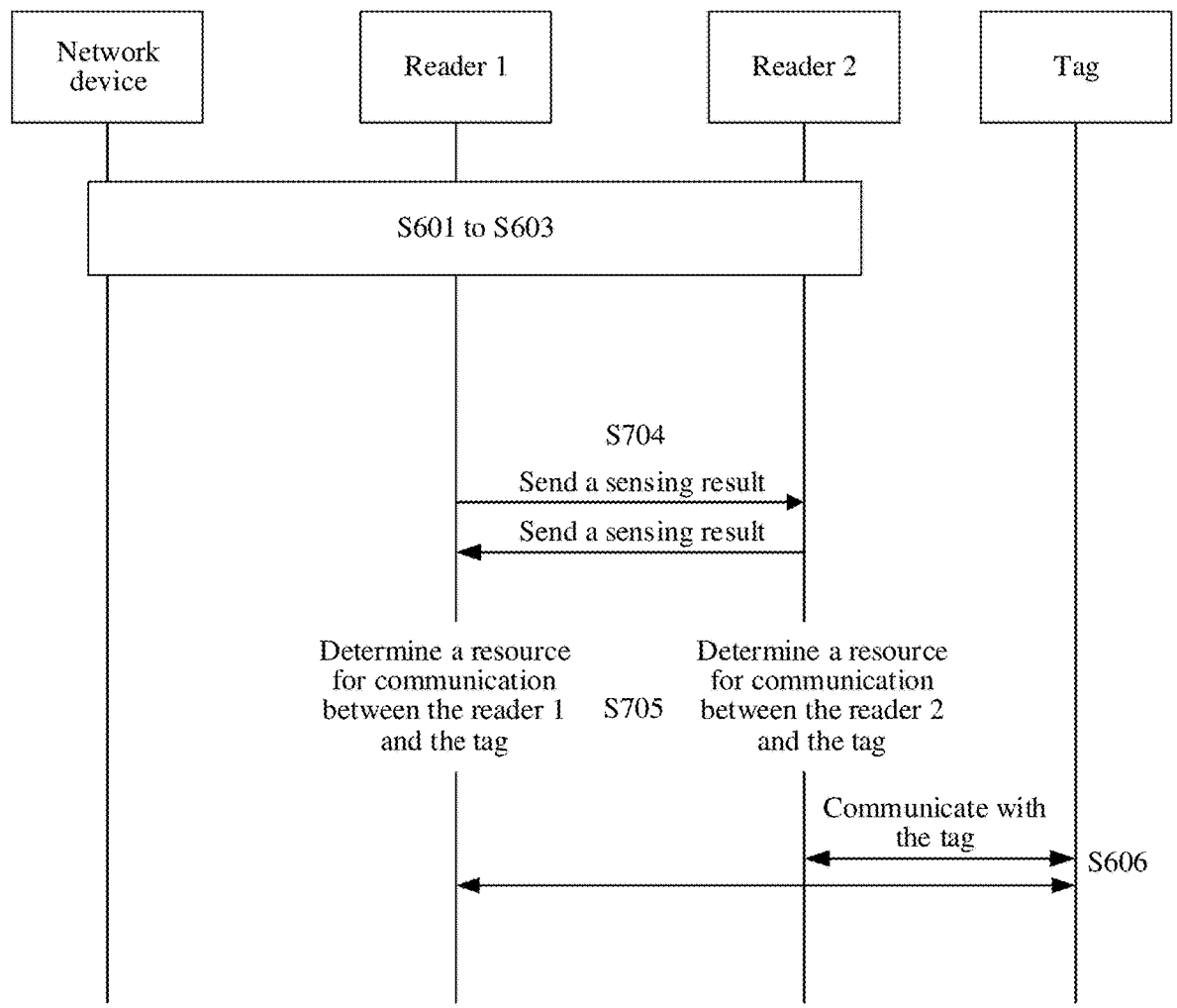
FIG. 7 is a schematic diagram of another sensing method according to an embodiment.

In a possible manner, the reader determines, based on the sensing result, the resource for communication between the reader and the tag. As shown in FIG. 7, FIG. 7 is based on FIG. 6. The following describes differences between FIG. 7 and FIG. 6.

S601 to S603 before S704 are similar to S601 to S603 in FIG. 6. Refer to S601 to S603 in FIG. 6. Details are not described again.

S704: The reader sends the sensing result. Different from FIG. 6, FIG. 6 shows that the reader sends the sensing result to the base station, but in FIG. 7, the reader sends the sensing result to another reader. For example, the reader 1 sends a first sensing result to the reader 2 on a third resource. The first sensing result includes RSRP of a received sensing signal that is of the reader 2 and that is measured by the reader 1. Similarly, the reader 2 sends a second sensing result of the reader 2 to the reader 1. For example, the reader 1 receives second information from the reader 2, and the second information includes the second sensing result of the reader 2.

S705: The reader determines a resource for communication between the reader and the tag.

S606: Communicate with the tag. This step is similar to S606 in FIG. 6. Details are not described again.

S704 and S705 are further described below.

In S704, the reader sends, to the another reader, the sensing result of the reader for the another reader and receives the sensing result sent by the another reader. As shown in FIG. 7, the reader 1 sends the sensing result for the reader 2 to the reader 2, and vice versa. The reader determines, according to a predefined rule, based on the received sensing result of the another reader, a resource that is to be occupied by the reader and that is for communication between the reader and the tag, to avoid signaling and scheduling overheads for communication between the reader and the base station.

The resource (the third resource) on which the reader sends the sensing result may be associated with a resource (a first resource) on which the reader sends the sensing signal. For example, the network device allocates, to three readers, resources on which sensing signals are sent. The network device allocates a resource 1, to a reader 1, on which the reader 1 sends the sensing signal, allocates a resource 2, to a reader 2, on which the reader 2 sends the sensing signal, and allocates a resource 3, to a reader 3, on which the reader 3 sends the sensing signal. A resource A on which the reader 1 sends a sensing result is associated with the resource 1. A resource B on which the reader 2 sends a sensing result is associated with the resource 2. A resource C on which the reader 3 sends a sensing result is associated with the resource 3. For example, a sequence in which the readers send the sensing results is the same as a sequence in which the readers send the sensing signals. Compared with the reader 2, the reader 1 sends the sensing signal first, and sends the sensing result first. The resource on which the reader sends the sensing result may also be associated with a number or an identifier of the reader.

In a possible manner, a resource for communication between readers and the tag has been determined in advance. In this case, the readers may not send a sensing result. In this case, a quantity of readers that send sensing results is different from a quantity of readers that send sensing signals. For example, the reader 1 does not send the sensing result. A resource A on which the reader 2 sends the sensing result is associated with the resource 2. A resource B on which the reader 3 sends the sensing result is associated with the resource 3. It is assumed that a sequence of the resource A, the resource B, and the resource C in time domain is that the resource A is earlier than the resource B, and the resource B is earlier than the resource C. When the reader 1 sends the sensing result, the reader 1 sends the sensing result on the resource A. When the reader 1 does not send the sensing result, the reader 2 sends the sensing result on the resource A, so that a communication latency of the reader 2 can be reduced.

There is an association relationship between the resource on which the reader sends the sensing result and the resource on which the reader sends the sensing signal previously. The resource on which the reader sends the sensing result may be determined based on the association relationship, to reduce overheads of the network device.

In an example, a start location of a resource set (a third resource set) for the readers (for example, the readers 1, 2, and 3) to send the sensing results may be determined based on an end location of a first resource set. For example, there is an interval between the end location of the first resource set and the start location of the third resource set. For example, the first resource set ends in an $n^{th}$ slot, and the start location of the third resource set is in an $(n+4)^{th}$ slot. The interval may be a predefined value, or may be indicated by using signaling (for example, the first information). An association relationship between the third resource and the first resource is that an index of the third resource in the third resource set is associated with the first resource. The reader 1 determines the start location of the third resource set based on the foregoing manner, and further determines the third resource in the third resource set.

In an example, there is an interval between an end location of the first resource and a start location of the third resource. For example, the first resource ends in an $n^{th}$ slot, and the start location of the third resource is in an $(n+4)^{th}$ slot. The interval may be a predefined value, or may be indicated by using signaling (for example, the first information).

Similarly, a resource (a fourth resource) on which the reader receives the second information is associated with a resource (a second resource) on which the reader receives a second sensing signal. There is an association relationship between the resource on which the reader receives the second information and the resource on which the reader receives the sensing signal, so that overheads of the network device can be reduced.

In an example, a time domain resource is used as an example to further describe, in S705, how the reader determines, according to a predefined rule by using the received sensing result of the another reader, a resource that is to be occupied by the reader and that is for communication between the reader and the tag. The reader determines, based on the sensing result, a time domain resource for communication between the reader and the tag, and communicates with the tag by using the time domain resource. In a possible manner of determining the time domain resource, the time domain resource may be determined based on a predetermined priority. For example, the priority may be an index (for example, an index of the first resource in the first resource set) of the resource on which the reader sends the sensing signal and that is indicated in the first information. A smaller index value indicates a higher priority. Each reader considers an occupation status of a time domain resource of a reader whose priority is higher than that of the reader. For example, there are three readers, and a priority is a reader 1>a reader 2>a reader 3. It is predefined that the reader 1 occupies a first time domain resource. The reader 2 learns that the reader 1 fixedly occupies the first time domain resource. Candidate resources of the reader 2 are the first time domain resource and a second time domain resource. The reader 2 determines, based on at least one of a sensing result for the reader 1 and a received sensing result of the reader 1 for the reader 2, whether the reader 2 can occupy a same time domain resource for communication between the reader 2 and the tag as that of the reader 1. For example, based on the sensing results, mutual interference between the reader 1 and the reader 2 is very small (for example, less than a threshold), and the reader 2 also occupies the first time domain resource. If the mutual interference between the reader 1 and the reader 2 is great, the reader 2 and the reader 1 cannot use the same time domain resource to communicate with the tag. In this case, the reader 2 occupies the second time domain resource to communicate with the tag. Similarly, candidate resources of the reader 3 are the first time domain resource, the second time domain resource, and a third time domain resource. In this case, the reader 3 learns the time domain resource for communication between the reader 1 and the tag. The reader 3 obtains interference between the reader 1 and the reader 2 based on at least one of the received sensing results of the reader 1 and the reader 2, and determines, according to the same method as that of the reader 2, a time domain resource for communication between the reader 2 and the tag. For example, the reader 1 uses the first time domain resource, and the reader 2 uses the second time domain resource. The reader 3 determines the time domain resource of the reader 3 based on sensing results of the reader 3 for the readers 1 and 2, and the time domain resources used by the reader 1 and the reader 2. Alternatively, the reader 3 determines the time domain resource of the reader 3 based on the sensing results sent by the reader 1 and the reader 2 to the reader 3, and the time domain resources used by the reader 1 and the reader 2. Alternatively, the reader 3 determines the time domain resource of the reader 3 based on the sensing results of the reader 3 for the reader 1 and the reader 2, the sensing results sent by the reader 1 and the reader 2 to the reader 3, and the time domain resources used by the reader 1 and the reader 2. For example, the reader 3 determines that mutual interference of the reader 3 and the reader 1 is great, and the reader 3 and the reader 1 cannot occupy the same resource. Mutual interference of the reader 3 and the reader 2 is small, and the reader 3 and the reader 2 can use the same resource. The reader 3 determines to use the second time domain resource. If each time domain resource can be used by a maximum of two readers, usage of the second time domain resource already reaches an upper limit. Assuming a reader 4 still needs to determine a resource for communication between the reader 4 and the tag, the reader 4 selects one of the first time domain resource and the third time domain resource. The reader determines, according to a predefined rule, by using at least one of a received sensing result of another reader and a sensing result obtained through measuring a sensing signal of the another reader, a resource that is to be occupied by the reader and that is for communication between the reader and the tag, so that signaling overheads between the reader and the base station are reduced.

In an example, a start location of a resource set (a second resource set) for the readers (for example, the readers 1, 2, and 3) to communicate with the tag may be determined based on an end location of a third resource set. For example, there is an interval between the start location of the second resource set and the end location of the third resource set. For example, the third resource set ends in an $n^{th}$ slot, and the start location of the second resource set is in an $(n+4)^{th}$ slot. The interval may be a predefined value, or may be indicated by using signaling (for example, the first information).

Figure 8:
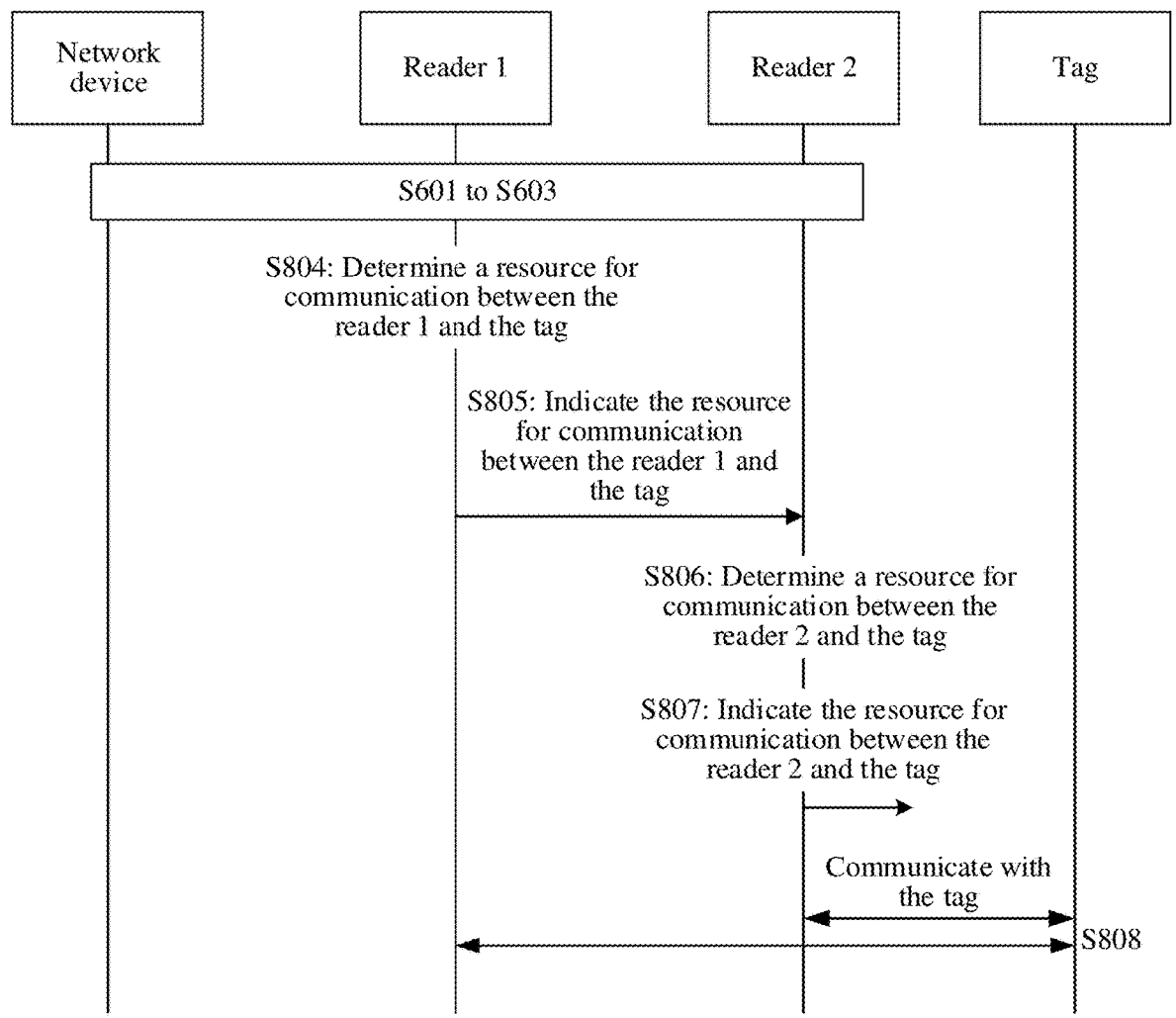
FIG. 8 is a schematic diagram of still another sensing method according to an embodiment.

In an example, the reader does not send a sensing result, determines, based on the sensing result, a resource for communication between the reader and the tag, and indicates, to another reader, the determined resource for communication between the reader and the tag. As shown in FIG. 8, FIG. 8 is based on FIG. 6 and FIG. 7. The following describes differences between FIG. 6 and FIG. 8.

S601 to S603 before S804 are similar to S601 to S603 in FIG. 6. For example, in S601 to S603, the reader 2 (the second device) receives first information from a first network device, where the first information indicates a first resource on which the reader 1 sends a first sensing signal and a second resource on which the reader 2 sends a second sensing signal. The reader 2 sends the second sensing signal on the second resource. The reader 2 receives the first sensing signal from the reader 1 (the first device) on the first resource. For details, refer to S601 to S603 in FIG. 6. Details are not described again.

S804: The reader 1 determines a resource for communication between the reader 1 and the tag. The reader 1 determines, based on a sensing result for another reader, the resource for communication between the reader 1 and the tag. For example, the reader 1 determines a first sensing result based on the second sensing signal.

S805: The reader 1 sends second information to the another reader. The second information indicates the resource (fifth resource) for communication between the reader 1 and the tag.

S806: The reader 2 determines a resource for communication between the reader 2 and the tag. The reader 2 determines, based on a sensing result for another reader, and the resource that is to be occupied by the reader 1 and that is for communication between the reader 1 and the tag, the resource for communication between the reader 2 with the tag. For example, the reader 2 determines a second sensing result based on the first sensing signal. The reader 2 receives the second information on a sixth resource. The reader 2 determines, based on the second sensing result and the second information, the resource (a seventh resource) for communication between the reader 2 and the tag.

S807: The reader 2 sends information to the another reader. This information indicates the seventh resource for communication between the reader 2 and the tag.

S808: The reader 2 communicates with the tag on the seventh resource. This step is similar to S606 in FIG. 6. Refer to S606 in FIG. 6. Details are not described again.

The reader does not send a sensing result, but sends information indicating a resource for communication between the reader and the tag. This helps reduce signaling overheads.

The following further describes S804 to S807 by using a time domain resource as an example.

The reader sends the second information to another reader. The second information indicates a time domain resource that is determined by the reader and that is for communication between the reader and the tag. A resource on which the reader sends the second information may be associated with a resource on which the reader sends a sensing signal. The resource on which the reader sends the second information may also be associated with a number or an identifier of the reader. For example, the network device respectively allocates, to three readers (readers 1 to 3), three resources on which the readers send sensing signals, and the three resources respectively correspond to resources on which the readers 1 to 3 send the second information. The network device allocates a resource 1, to the reader 1, on which the reader 1 sends the sensing signal, allocates a resource 2, to the reader 2, on which the reader 2 sends the sensing signal, and allocates a resource 3, to the reader 3, on which the reader 3 sends the sensing signal. A resource A on which the reader 1 sends the second information is associated with the resource 1. A resource B on which the reader 2 sends the second information is associated with the resource 2. A resource C on which the reader 3 sends the second information is associated with the resource 3. For example, a time sequence in which the readers 1 to 3 send the second information may be the same as a time sequence in which the readers 1 to 3 send the sensing signals.

In a possible manner, a resource for communication between readers and the tag has been determined in advance. In this case, the readers may not send the second information. It is assumed that the resource 1 is earlier than the resource 2 in time domain, and the resource 2 is earlier than the resource 3 in time domain. In a possible manner, the reader 1 fixedly communicates with the tag on the resource 1, and another reader also learns that the reader 1 occupies the resource 1. The reader 1 may not send the second information. The reader 2 and the reader 3 need to indicate resources that are occupied by the reader 2 and the reader 3 and that are for separate communication between the reader 2 and the reader 3, and the tag.

In a possible manner, each reader sequentially determines, in a predefined sequence, time domain resources for communication between the readers and the tag, as shown in the following.

In a predefined manner, it is predefined that the reader 1 occupies a resource A and does not send the second information. The reader 2 learns that the reader 1 occupies the resource A, and determines, based on a sensing result for the reader 1, whether the reader 2 and the reader 1 can occupy the same resource A. If yes, the reader 2 determines to occupy the resource A. Otherwise, the reader 2 determines to occupy a resource B to communicate with the tag. The reader 2 sends the second information to another reader, to indicate that the reader 2 is about to occupy the resource B.

It can be assumed that the reader 2 indicates to the another reader that the reader 2 is about to occupy the resource B. The reader 3 learns that the reader 1 occupies the resource A, and determines, based on the resource B indicated by the reader 2 and sensing results of the reader 3 for the reader 2 and the reader 1, whether the reader 3 can occupy the resource A. If no, the reader 3 determines whether the reader 3 can occupy the resource B. If no, the reader 3 occupies a resource C. In addition, the reader 3 indicates the resource that is to be occupied by the reader 3 to another reader. Other readers are deduced by analogy.

In an example, it is predefined that the reader 1 is about to occupy a resource A. Candidate resources of the reader 2 are the resource A and a resource B. Based on sensing results, mutual interference between the reader 1 and the reader 2 is very small (for example, less than a threshold), and the reader 2 also occupies the resource A. If the mutual interference between the reader 1 and the reader 2 is great, the reader 2 and the reader 1 cannot use the same resource to communicate with the tag. In this case, the reader 2 occupies the resource B to communicate with the tag. The reader 2 sends the second information, indicating that the reader 2 is about to occupy the resource B. Similarly, candidate resources of the reader 3 are the resource A, the resource B, and a resource C. At this time, the reader 3 learns the resources used by the reader 1 and the reader 2 to communicate with the tag. For example, the reader 1 uses the resource A, and the reader 2 uses the resource B. The reader 3 determines, based on the sensing result of the reader 3 for the reader 1, that interference between the reader 3 and the reader 1 is great, and the reader 3 and the reader 1 cannot occupy the same resource. Therefore, the reader 3 cannot occupy the resource A. The reader 3 receives the second information from the reader 2, and learns that the reader 2 is about to occupy the resource B. The reader 3 determines, based on the sensing result of the reader 3 for the reader 2, that an impact between the reader 3 and the reader 2 is small, and the reader 3 and the reader 2 may occupy the same resource. Therefore, the reader 3 determines to occupy the resource B, and sends the second information of the reader to indicate that the reader 3 is about to occupy the resource B. Optionally, if each resource can be used by a maximum of two readers, usage of the resource B reaches an upper limit. Assuming a reader 4 still needs to determine a resource for communication between the reader 4 and the tag, the reader 4 can select the resource A or the resource C.

For a manner of determining a start location of a third resource set and a start location of a second resource set, refer to the descriptions in FIG. 7.

Figure 9:
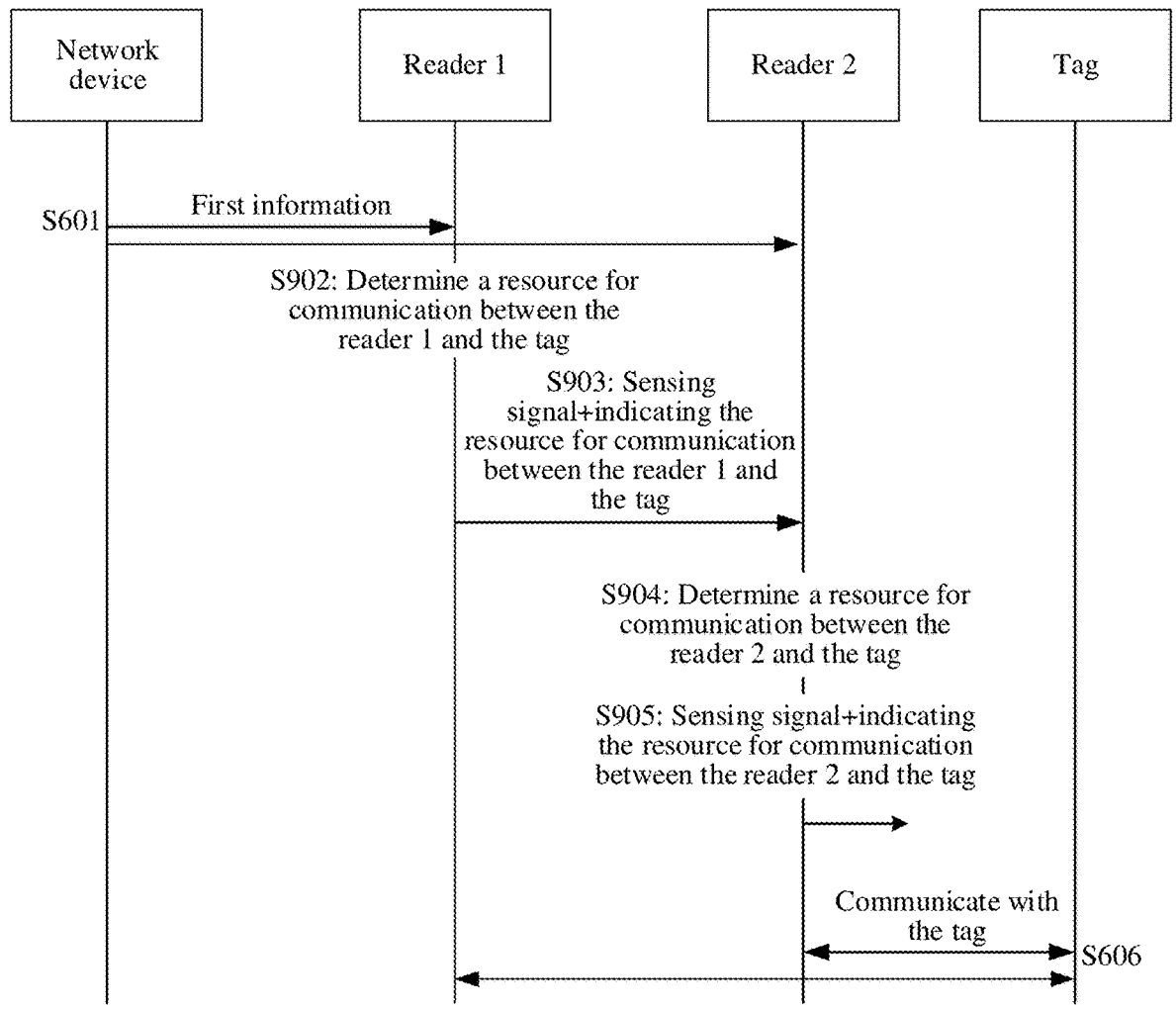
FIG. 9 is a schematic diagram of still another sensing method according to an embodiment.

In a possible manner, the reader sends, on one time domain resource, the sensing signal and information indicating the resource for communication between the reader and the tag. As shown in FIG. 9, FIG. 9 is based on FIG. 7 and FIG. 8.

S601: The step is similar to S601 in FIG. 6. For example, a reader 1 and a reader 2 receive first information from a first network device, where the first information indicates a first resource and a second resource. For details, refer to FIG. 6. Details are not described again.

S902: The reader 1 determines a resource for communication between the reader 1 and a tag. The reader 1 determines, according to a predefined rule, the resource for communication between the reader 1 and the tag.

S903: The reader 1 sends a first sensing signal and second information of the reader 1 on the first resource. The second information indicates the resource (a fifth resource) for communication between the reader 1 and the tag. The reader 2 receives the first sensing signal and the second information from the reader 1 on the first resource.

S904: The reader 2 determines a resource for communication between the reader 2 and the tag. The reader 2 determines, based on a sensing result for the reader 1 and the resource for communication between the reader 1 and the tag, the resource for communication between the reader 2 and the tag. For example, the reader 2 determines a second sensing result based on the first sensing signal. The reader 2 determines, based on the second sensing result and the second information, a seventh resource for communication between the reader 2 and the tag.

S905: The reader 2 sends, on the second resource, a second sensing signal and information indicating the seventh resource.

S606: Communicate with the tag. This step is similar to S606 in FIG. 6. Details are not described again.

In a possible implementation, the first sensing result includes a measured value of the second sensing signal. When the measured value is greater than (or greater than or equal to, less than, or less than or equal to) a first threshold, the fifth resource and the seventh resource do not overlap. Otherwise, the fifth resource is the same as the seventh resource. Based on a mutual impact between the readers, it is determined whether to occupy the same resource. This can improve resource utilization.

The reader sends, by using one resource, the sensing signal and the resource indicating communication between the reader and the tag, so that a latency can be reduced.

FIG. 6 to FIG. 9 are further described by using an example in which a resource is a time domain resource in FIG. 10 to FIG. 18.

Figure 10:
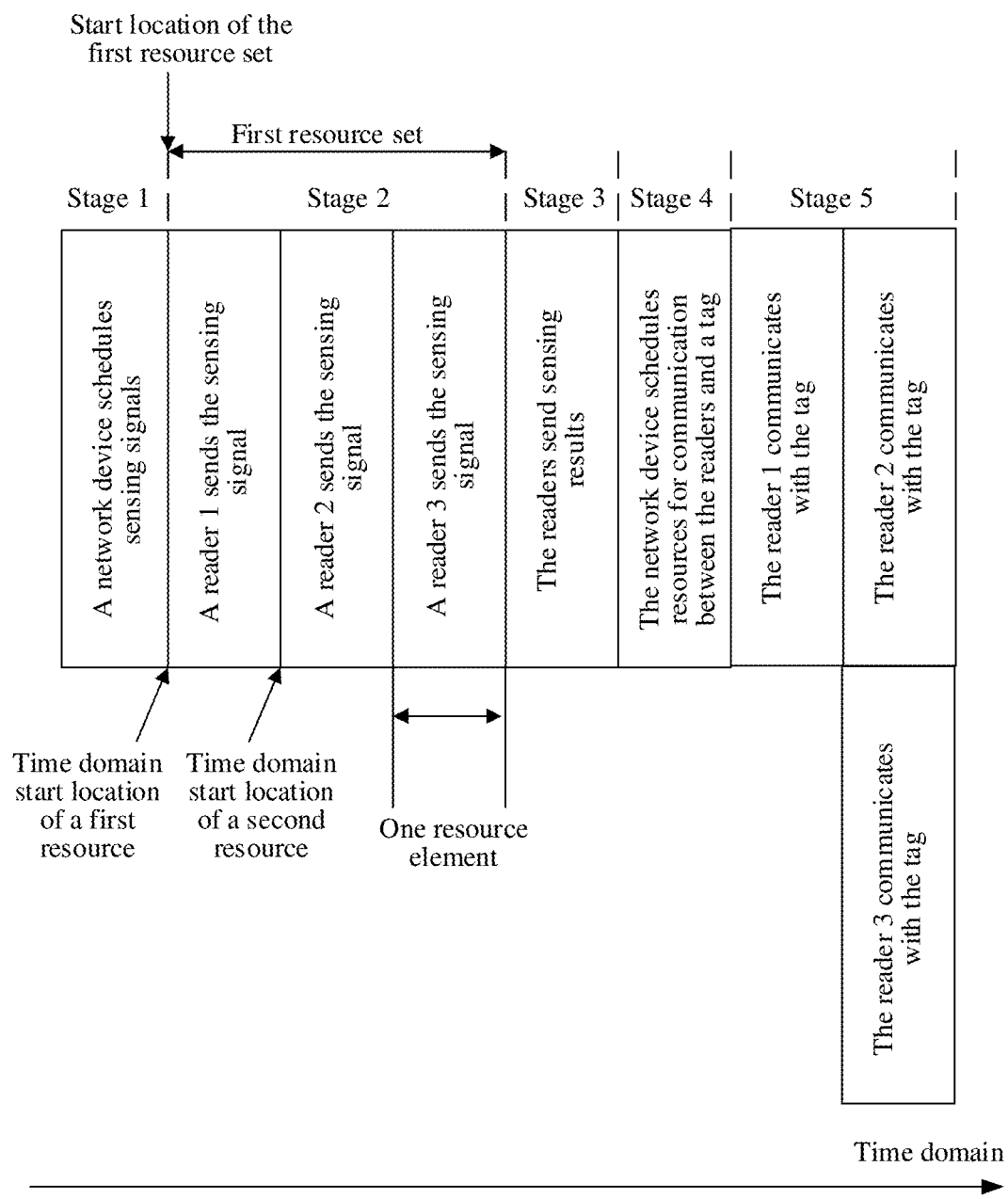
FIG. 10 is a schematic diagram of still another sensing method according to an embodiment.

FIG. 10 shows a communication process of a network device, readers, and a tag by using an example in which a resource is a time domain resource.

In FIG. 10, there is a network device and three readers. In FIG. 10, five stages are included.

Stage 1: The network device schedules a sensing signal. That is, the network device sends first information. This step is similar to S601.

Stage 2: The reader sends the sensing signal. This step is similar to step S602.

Stage 3: The reader sends a sensing result. This step is similar to S604. In FIG. 10, that the reader sends the result in Stage 3 means that readers 1, 2, and 3 respectively send sensing results.

Stage 4: The network device schedules a resource for communication between the reader and the tag. In other words, the network device schedules a communication resource of RFID. This step is similar to S605.

Stage 5: The reader communicates with the tag. This step is similar to S606.

In FIG. 10 to FIG. 18, a round of sensing process is defined, and there is Stage 2 in the round of sensing process.

As shown in FIG. 10, in Stage 5, it is assumed that a time domain resource whose index is 1 is allocated to a reader 1, and a time domain resource whose index is 2 is allocated to readers 2 and 3. The readers 2 and 3 communicate with the tag on the same time domain resource. For example, the readers 2 and 3 use the time domain resource whose index is 2 for inventory.

FIG. 10 is also a schematic diagram of a first resource set, a resource element, a time domain start location of a first resource, and a time domain start location of a second resource.

Figure 11:
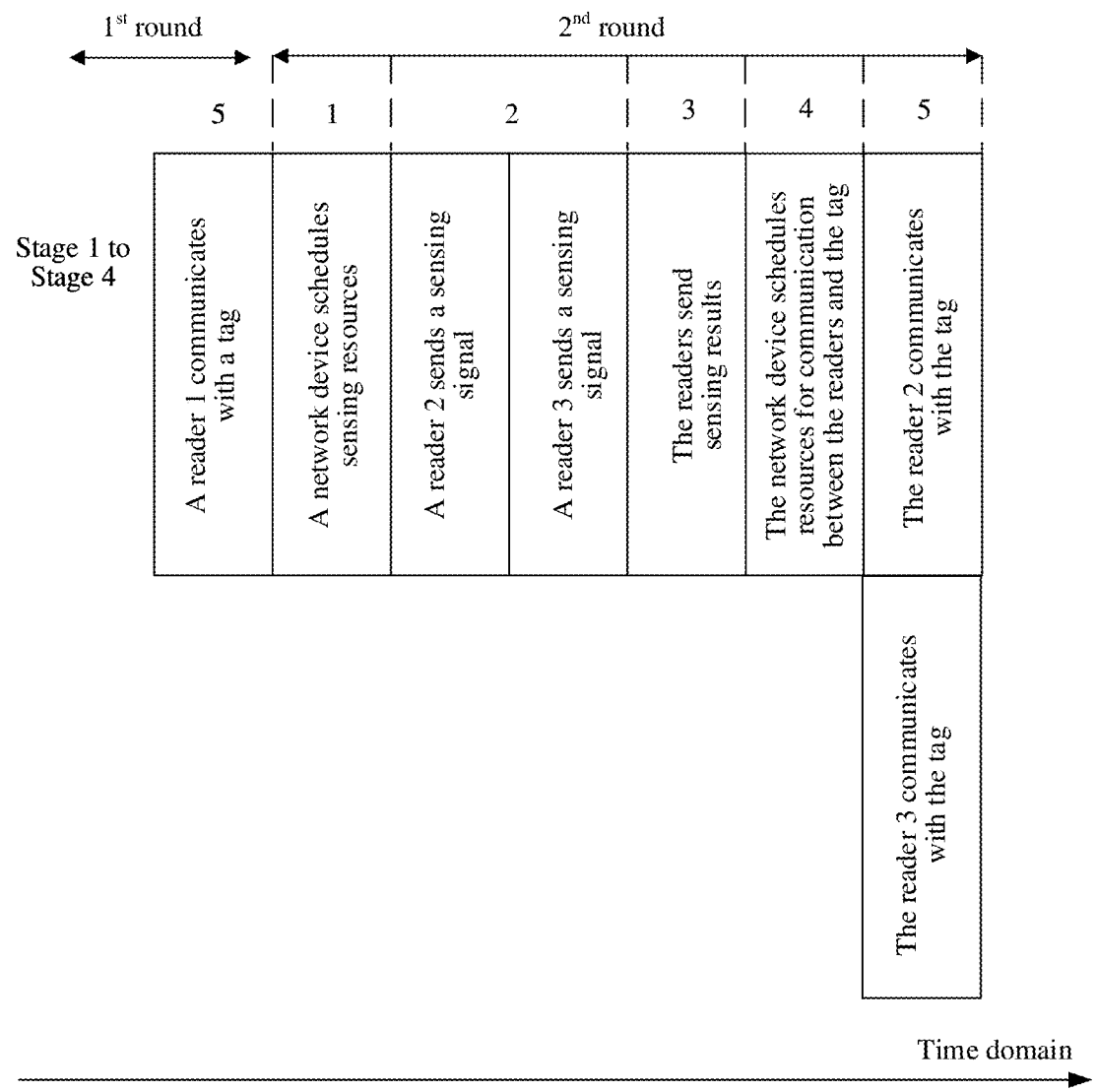
FIG. 11 is a schematic diagram of still another sensing method according to an embodiment.

In FIG. 10, the network device schedules, at a time, the resources for communication between the reader 1, the reader 2, and the reader 3, and the tag. As shown in FIG. 11, the network device may also schedule, at a time, the resource for communication between a part of the reader 1, the reader 2, and the reader 3, and the tag. FIG. 11 is based on FIG. 10. For Stage 1 to Stage 4 in the $1^{st}$ round in FIG. 11, refer to Stage 1 to Stage 4 in FIG. 10. However, in Stage 4 in the $1^{st}$ round in FIG. 11, only the reader 1 is scheduled to communicate with the tag.

In the $2^{nd}$ round of sensing process, the network device schedules a sensing resource, and may schedule a reader that is not scheduled in a previous round, for example, the reader 2 and the reader 3, or may schedule a new reader that does not participate in the previous round of sensing, for example, a reader 4. In the $2^{nd}$ round of sensing in FIG. 11, the network device determines, based on received sensing results, that interference between the reader 2 and the reader 3 is small, and schedules the reader 2 and the reader 3 to communicate with the tag on a same time domain resource.

Figure 12:
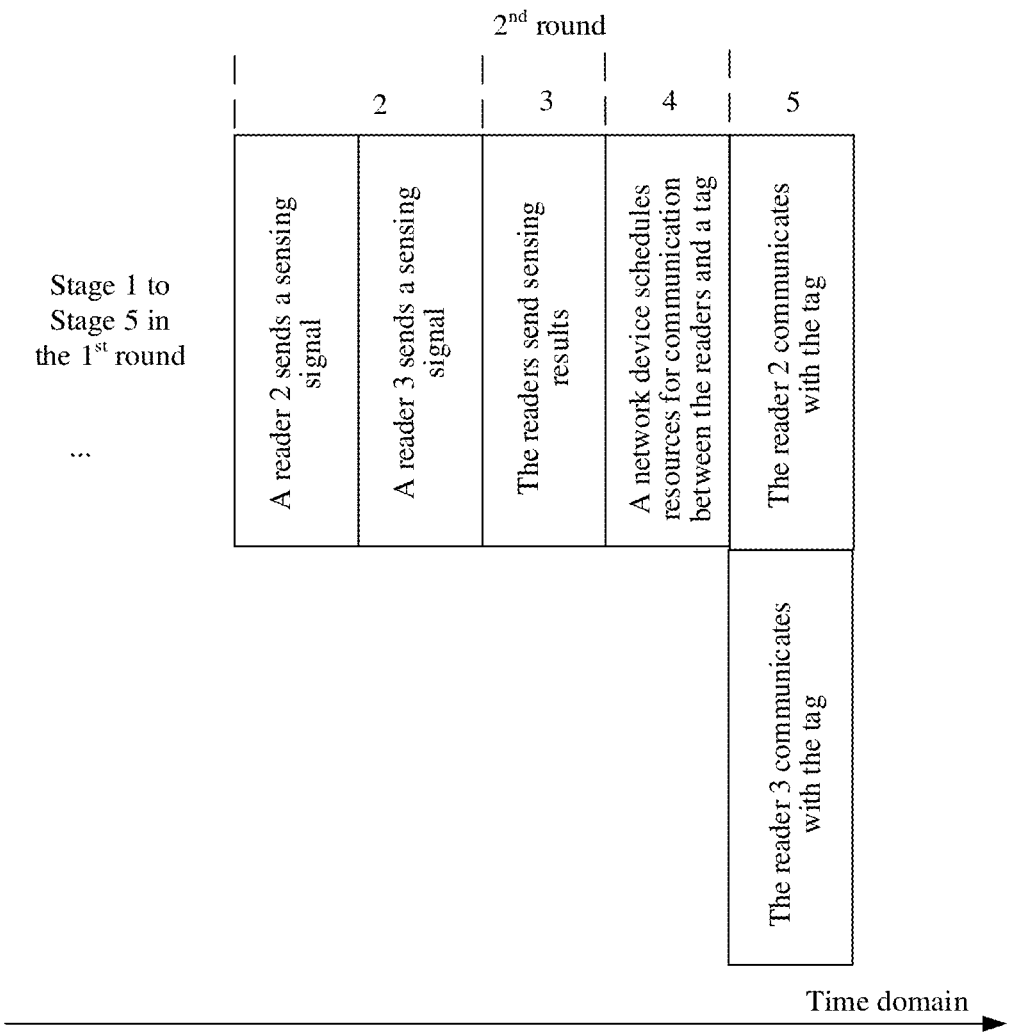
FIG. 12 is a schematic diagram of still another sensing method according to an embodiment.

FIG. 12 is based on FIG. 11. For Stage 1 to Stage 5 in the $1^{st}$ round in FIG. 12, refer to Stage 1 to Stage 5 in the $1^{st}$ round in FIG. 10. In Stage 4 in the $1^{st}$ round in FIG. 12, the network device notifies readers participating in sensing which reader is scheduled to communicate with the tag. For example, the network device notifies the reader 2 and the reader 3 that the reader 1 is scheduled to communicate with the tag. Optionally, the network device notifies the readers participating in sensing which reader is not scheduled to communicate with the tag. The network device may notify the readers in a multicast or unicast manner. The unscheduled reader determines, based on a notification (for example, second information) of the network device, a total quantity of time domain resources on which sensing signals in a next round are sent, and a time domain resource on which the reader sends the sensing signal and that corresponds to the reader. For example, in the $2^{nd}$ round of sensing, the reader 2 and the reader 3 determine, based on the notification of the network device, that the reader 2 and the reader 3 are not scheduled in the $1^{st}$ round. The reader 2 and the reader 3 determine, according to a predefined rule, a time domain resource of the reader 2 and the reader 3 in the $2^{nd}$ round of sensing. In one manner, the time domain resource of the reader 2 and the reader 3 in the $2^{nd}$ round of sensing is associated with a time domain resource on which the network device schedules the reader 2 and the reader 3 to perform sensing in the $1^{st}$ round. For example, a sequence in which the reader 2 and the reader 3 send sensing signals in the $2^{nd}$ round is the same as a sequence in which the reader 2 and the reader 3 send sensing signals in the $1^{st}$ round. As shown in FIG. 2, in the $2^{nd}$ round of sensing, the reader 2 first sends the sensing signal, and then the reader 3 sends the sensing signal. The sequence that in which reader 2 and the reader 3 send the sensing signals in the $2^{nd}$ round may also be opposite to the sequence in which the reader 2 and the reader 3 send the sensing signals in the $1^{st}$ round, that is, a reader that first sends a sensing signal in the $1^{st}$ round sends a sensing signal later in the $2^{nd}$ round. For Stage 3 to Stage 5 in the $2^{nd}$ round of sensing in FIG. 12, refer to FIG. 10. Details are not described again.

Figure 13:
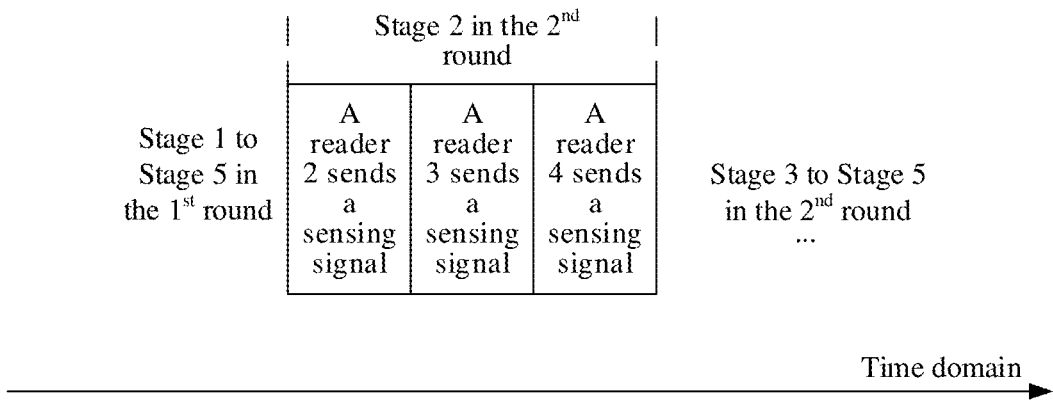
FIG. 13 is a schematic diagram of still another sensing method according to an embodiment.

FIG. 13 is based on FIG. 12. No network device performs scheduling in the $2^{nd}$ round of sensing, and a new reader 4 may further participate in a second stage to send a sensing signal. In FIG. 13, a total quantity of time domain resources on which sensing signals are sent (or scheduled to be sent) in each round is limited, for example, a maximum of three time domain resources. There are more readers that need to communicate with the tag, for example, five readers need to communicate with the tag. The five readers are numbered 1 to 5, that is, a reader 1 to a reader 5. In the $1^{st}$ round, the network device allocates sensing time domain resources to the reader 1 to the reader 3. However, in the $1^{st}$ round, the network device only schedules the reader 1 to communicate with the tag. It is assumed that a number of the reader is associated with a priority of a sensing process scheduled by the network device. For example, a reader with a smaller number has a higher priority than a reader with a larger number. In the $2^{nd}$ round, the reader 2 to the reader 5 have sensing requirements. However, compared with the reader 5, the reader 2 to the reader 4 have higher priorities. Therefore, in Stage 2 in the $2^{nd}$ round, the reader 2 to the reader 4 send sensing signals.

Figure 14:
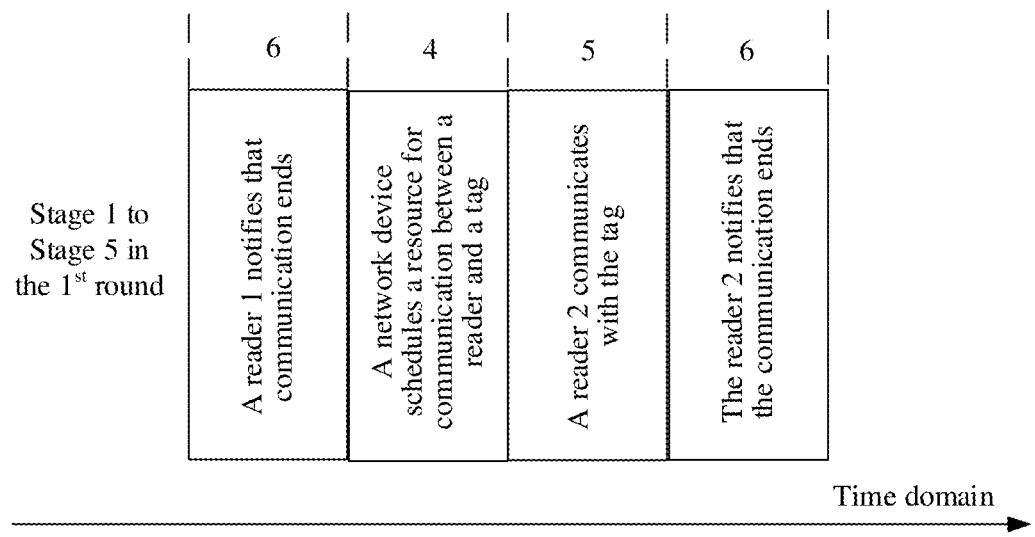
FIG. 14 is a schematic diagram of still another sensing method according to an embodiment.

In the foregoing example, a length of a time domain resource for each communication between the reader and the tag is fixed. FIG. 14 shows how to perform sensing and subsequent communication each time when a length of a time domain resource for communication between the reader and the tag is not fixed. FIG. 14 is based on FIG. 12. In FIG. 14, Stage 6 is introduced, in which the reader notifies the network device that communication between the reader and the tag ends. In this case, when the communication between the reader and the tag ends is determined by the reader. If the reader 1 finds, after one or more times of querying the tag, that no new tag reports a tag identifier, the reader 1 determines that communication between the reader 1 and the tag ends, and notifies the network device that the communication between the reader 1 and the tag ends. The network device schedules, at a time, one reader to communicate with the tag. For a first time, the network device schedules the reader 1 to communicate with the tag. For a second time, the network device schedules the reader 2 to communicate with the tag.

Figure 15:
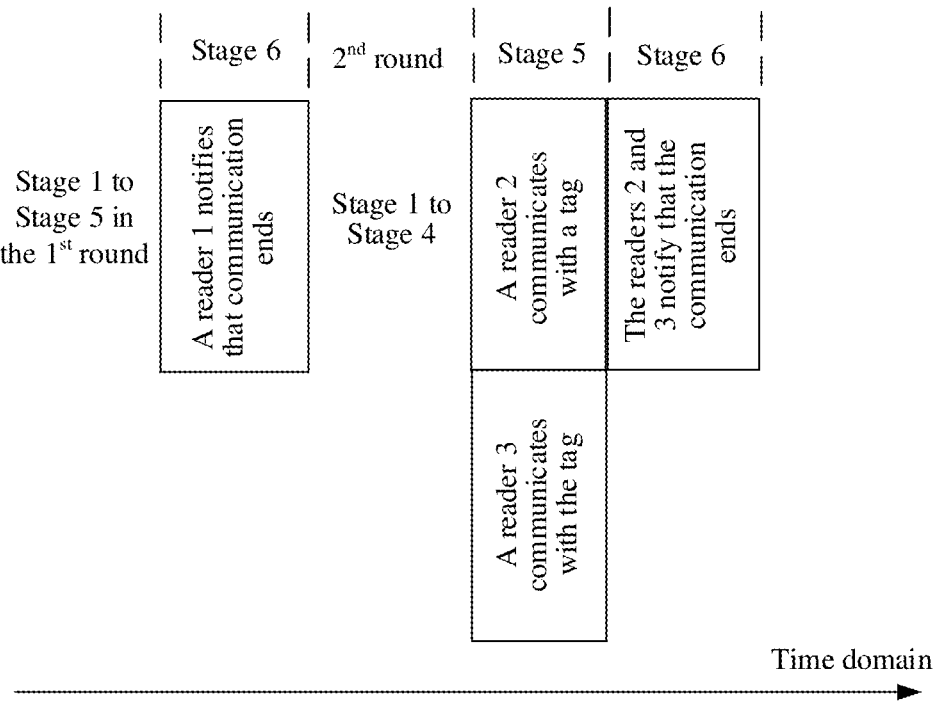
FIG. 15 is a schematic diagram of still another sensing method according to an embodiment.

FIG. 15 is based on FIG. 14. Stage 1 to Stage 6 in the $1^{st}$ round in FIG. 15 are similar to those in FIG. 14. Details are not described again. However, the $2^{nd}$ round of sensing process in FIG. 15 has complete Stage 1 to Stage 6. During the $2^{nd}$ round of sensing process, the network device schedules the readers 2 and 3 to start communicating with the tag at the same time. After completing communication with the tag, the readers 2 and 3 send information to the base station to notify the network device that the communication ends.

Figure 16:
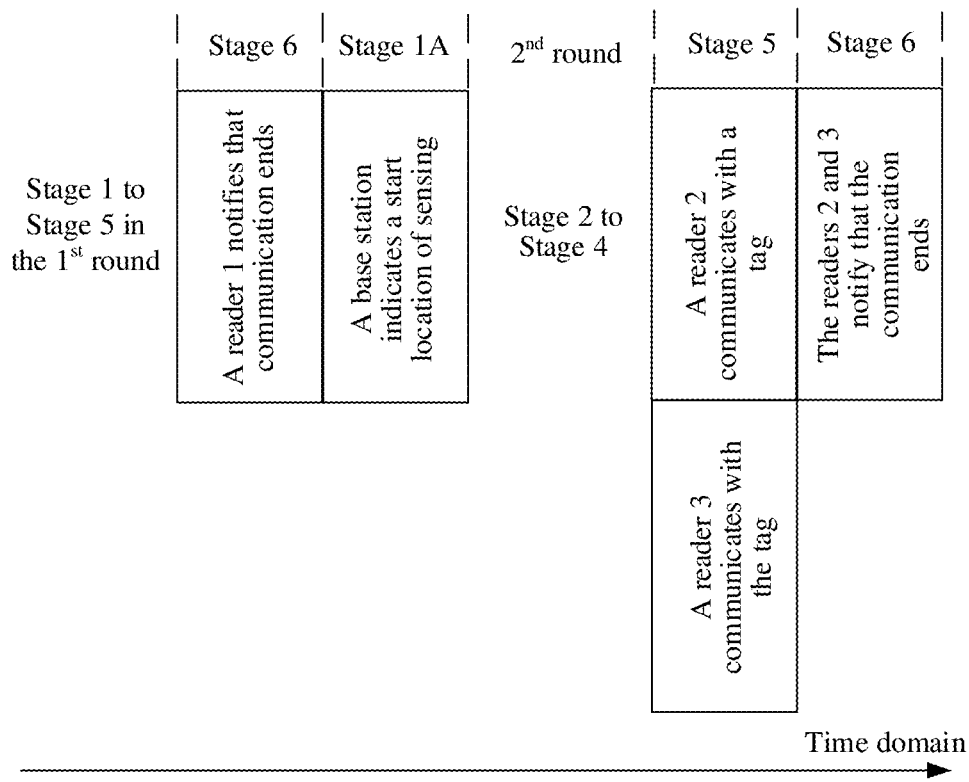
FIG. 16 is a schematic diagram of still another sensing method according to an embodiment.

FIG. 16 is based on FIG. 15. Stage 1 to Stage 6 in the $1^{st}$ round in FIG. 16 are similar to those in FIG. 14 and FIG. 15. Details are not described again. There is a difference between Stage 1A in the $2^{nd}$ round and Stage 1 in FIG. 15. In Stage 1A, the network device indicates a start location of a first resource set. In the $1^{st}$ round, the reader 1 is scheduled to communicate with the tag, and the readers 1 to 3 send sensing signals. The readers 2 and 3 are not scheduled in the $1^{st}$ round. In the $2^{nd}$ round, a size of a time domain resource element on which the reader sends the sensing signal is the same as that in the $1^{st}$ round. In the $1^{st}$ round, the readers 2 and 3 obtain the following information: The readers 1 to 3 send the sensing signals, and the reader 1 is scheduled to communicate with the tag. Based on the above information, the readers 2 and 3 learn that the readers 2 and 3 need to send the sensing signals in the $2^{nd}$ round. A resource on which the sensing signals are sent is determined based on respective priorities of the readers 2 and 3. For example, if the priority of the reader 2 is higher than that of the reader 3, the reader 2 occupies the $1^{st}$ resource in the first resource set to send the sensing signal. The reader 3 occupies the $2^{nd}$ resource in the first resource set to send the sensing signal. Another process is similar to that in FIG. 15. Details are not described again.

Stages 4 (where the network device schedules the resource for communication between the reader and the tag) in FIG. 10 to FIG. 16 are deleted to describe the schematic diagram of the communication process (where the reader determines, based on the sensing result, the resource for communication between the reader and the tag) in FIG. 7. As shown in FIG. 10, after Stage 4 is deleted, Stages 1, 2, 3, and 5 are a round of sensing process. As shown in FIG. 11, after Stage 4 is deleted, the $1^{st}$ round of sensing process includes Stages 1, 2, 3, and 5, and the $2^{nd}$ round of sensing process includes Stages 1, 2, 3, and 5. As shown in FIG. 12, after Stage 4 is deleted, the $1^{st}$ round of sensing process includes Stages 1, 2, 3, and 5. The $2^{nd}$ round of sensing process includes Stages 2, 3, and 5. As shown in FIG. 12, after Stage 4 is deleted, the $1^{st}$ round of sensing process includes Stages 1, 2, 3, and 5. The $2^{nd}$ round of sensing process includes Stages 2, 3, and 5. As shown in FIG. 14, after Stage 4 is deleted, the $1^{st}$ round of sensing process includes Stages 1, 2, 3, 5, and 6 in a first time, and further includes Stages 5 and 6 in a second time. Different from FIG. 10 to FIG. 14, in this case, in Stage 3, the reader sends a sensing result to another reader. For how the reader determines, based on the sensing result, the resource for communication between the reader and the tag, refer to the descriptions in FIG. 7.

Figure 17:
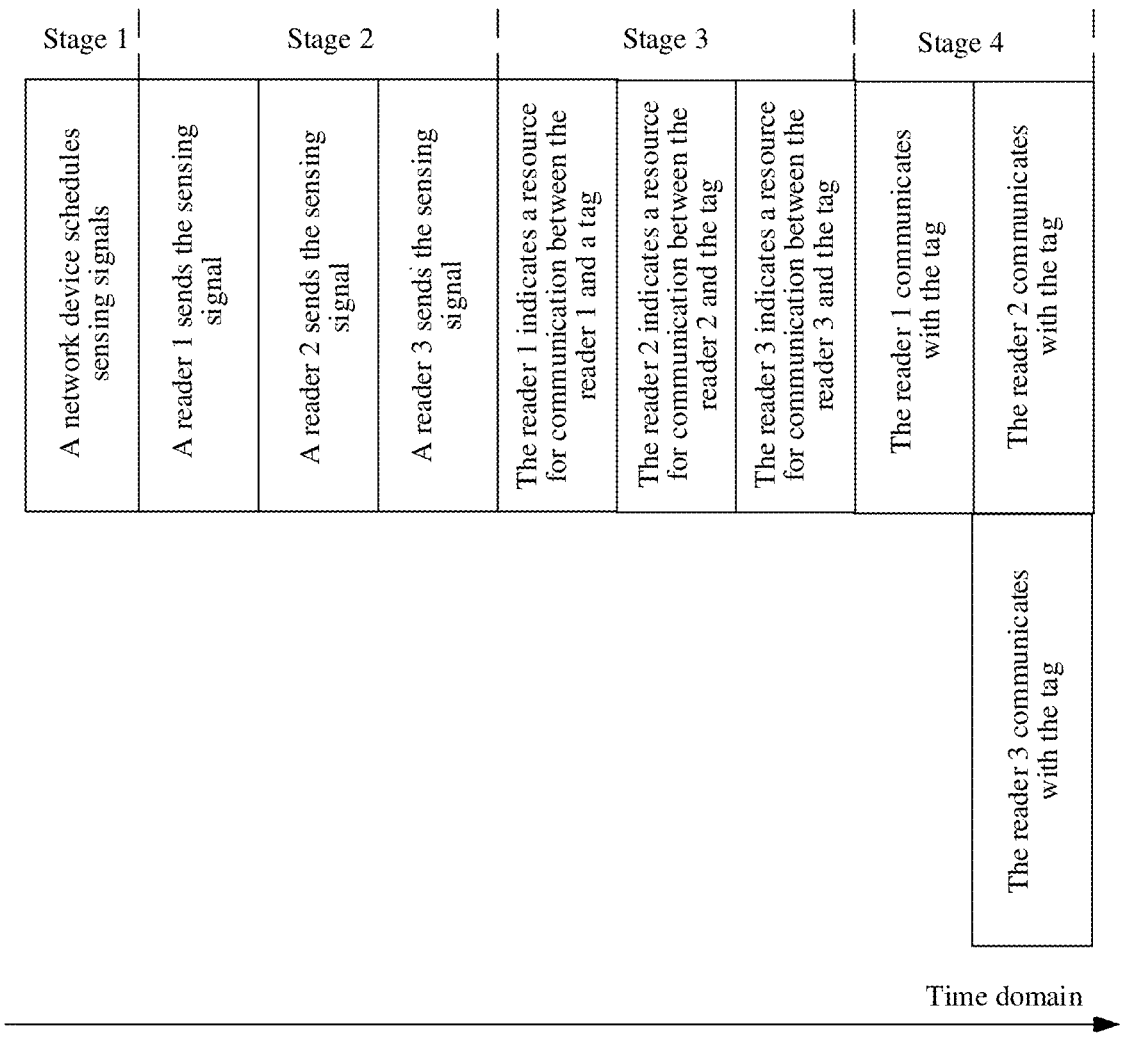
FIG. 17 is a schematic diagram of still another sensing method according to an embodiment.

FIG. 17 is a schematic diagram of communication between a network device, readers, and a tag in time domain in the case shown in FIG. 8.

Compared with FIG. 10, Stages 1 and 2 in FIG. 17 are similar to Stages 1 and 2 in FIG. 10, and Stage 4 in FIG. 17 is similar to Stage 5 in FIG. 10. Details are not described again. A main difference between FIG. 17 and FIG. 10 lies in Stage 3. In Stage 3 in FIG. 17, the reader indicates a resource for communication between the reader and the tag. For example, readers 1 to 3 sequentially send information indicating a resource for communication between the reader and the tag to another reader. For other details, refer to the descriptions in FIG. 6 to FIG. 16. Details are not described again.

Figure 18:
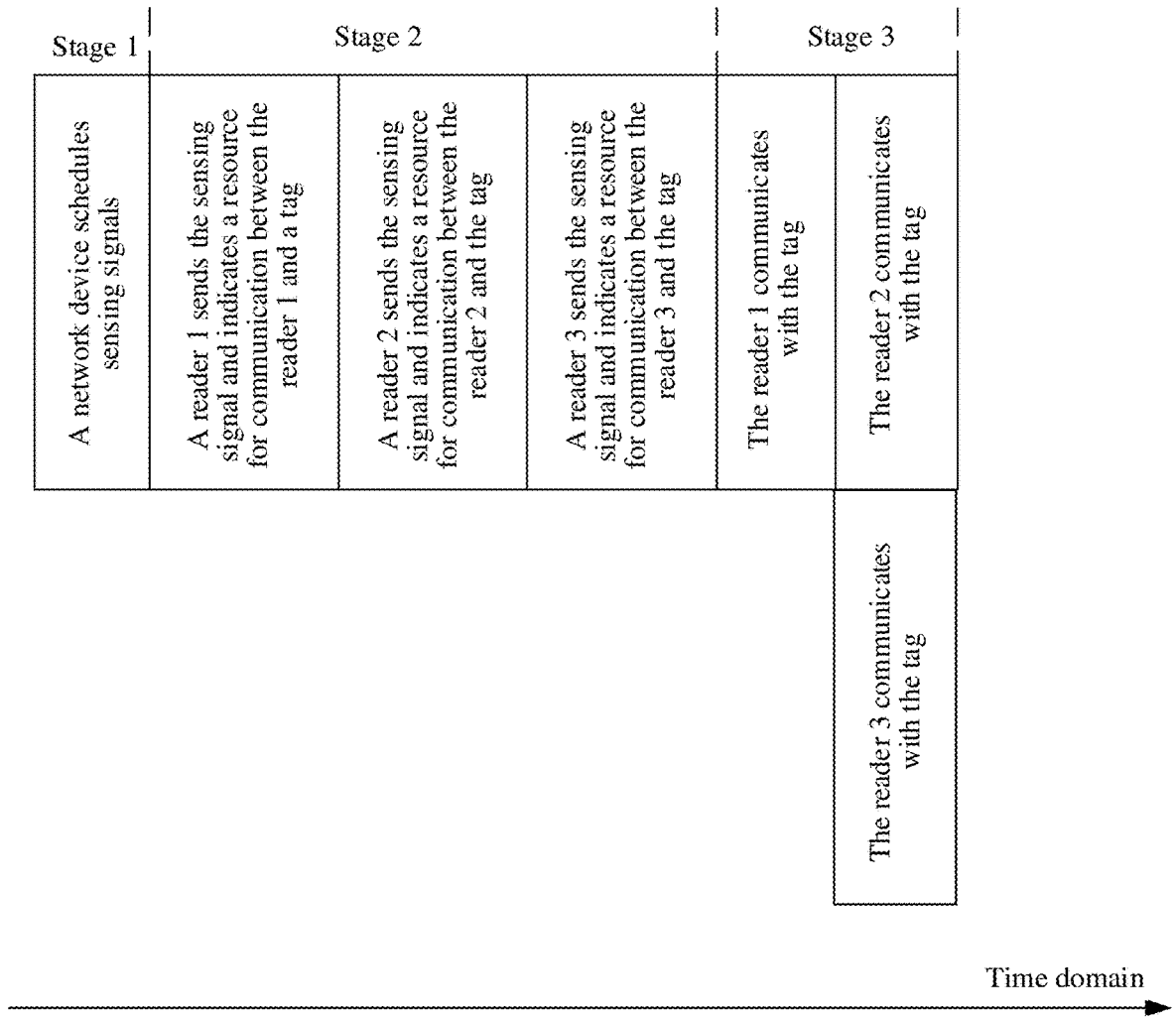
FIG. 18 is a schematic diagram of still another sensing method according to an embodiment.

FIG. 18 is a schematic diagram of communication between a network device, readers, and a tag in time domain in the case shown in FIG. 9. Stage 1 in FIG. 18 is similar to Stage 1 in FIG. 17, and Stage 3 in FIG. 18 is similar to Stage 4 in FIG. 17. Details are not described again. In Stage 2 in FIG. 18, the reader sends, on a time domain resource, a sensing signal and indicates a resource for communication between the reader and the tag. As shown in FIG. 18, a reader 1 sends, on a time domain resource, a sensing signal and information indicating a resource for communication between the reader 1 and the tag. Then, a reader 2 sends, on a time domain resource, a sensing signal and information indicating a resource for communication between the reader 2 and the tag. Finally, a reader 3 sends, on a time domain resource, a sensing signal and information indicating a resource for communication between the reader 3 and the tag.

For other details, refer to the descriptions in FIG. 6 to FIG. 16. Details are not described again.

For the foregoing embodiment, in an example, a time domain resource on which a sensing signal is sent includes A time domain symbols, and A>1. The following format may be used to carry the sensing signal.

Format 1: The first k symbols in the A time domain symbols are used to transmit the sensing signal. One symbol carries one sequence. For a transmission manner of a single symbol, refer to a transmission manner of a physical sidelink feedback channel (PSFCH) in section 8.3.4 of 3GPP TS38.211 v16.2.0. The following m symbols are gap symbols (GAPs). The gap symbol does not transmit any content and can be used for transmitting/receiving conversion, to avoid interference caused by timing inconsistency between readers (k+m=A). For example, the time domain resource on which the sensing signal is sent includes five time domain symbols, the first four symbols are used to transmit the sensing signal, and the last one symbol is used as a gap symbol.

Format 2: In each of the first k symbols in the A time domain symbols, some RE locations on a frequency domain resource carry a sequence, and other RE locations may be set to transmit all-0 bit information, transmit random bit information, or the like. For a transmission manner of Format 2, refer to a transmission manner of a physical sidelink control channel (PSCCH) DMRS in section 8.4.1.3 of 3GPP TS38.211 v16.2.0. The following m symbols are gap symbols. In a possible manner, the time domain resource on which the sensing signal is sent includes one slot, one slot includes 14 symbols. In the first 13 symbols, one RE in every four REs that are in frequency domain and that are of one symbol is the sensing signal, and RE frequency domain locations of sensing signals on each symbol are the same. Finally, the last symbol is used as a gap symbol.

Format 3: A part of symbols of the first k symbols in the A time domain symbols carry a sequence. The sequence may occupy all frequency domain resources allocated in the symbol, or may occupy only a part of REs. A RE that is in the A symbols and that does not carry the sensing signal may be used to transmit information, may be used to transmit all-0 bit information, transmit random bit information, or the like. For a transmission manner of Format 3, refer to a transmission manner of a physical sidelink shared channel (PSSCH) DMRS in section 8.4.1.1 of 3GPP TS38.211 v16.2.0. Same as Format 1 and Format 2, the following m symbols are gap symbols. For example, A=14, the sensing signal exists on the $1^{st}$ symbol and the last symbol in the first 13 symbols, one RE in every three REs in frequency domain is the sensing signal, and the $14^{th}$ symbol is used as a gap symbol.

To improve reliability, the sensing signal may be sent repeatedly. Format 2 is used as an example, and the sensing signal is repeatedly sent once. In this case, the time domain resource on which the sensing signal is sent includes two slots, and in the two slots, the $2^{nd}$ slot is a repetition of the $1^{st}$ slot. Optionally, in the two slots, the sensing signal is repeatedly sent once, but there is a GAP only in the $2^{nd}$ slot.

For the reader to send information indicating communication ends, Format 1 to Format 3 can also be used to send the information.

A sensing result of the reader can be sent in the following format:

Format 4: Format 4 is similar to Format 2, but differs from Format 2 in the following aspects:

(1) An RE that is in a symbol that is not a GAP and that does not carry a sequence does not transmit all-0 bit information or transmit random bit information, but carries useful data. For example, the useful data is the sensing result (For manners of encoding, modulation, and resource mapping, refer to a transmission manner of a physical sidelink control channel (PSCCH) in section 8.3.2 of 3GPP TS38.211 v16.2.0 and section 8.3 of TS38.212 v16.2.0).

(2) The sensing signal in Format 2 is used as a DMRS in Format 4.

Format 5: Format 5 is similar to Format 3, but differs from Format 3 in the following aspects:

(1) An RE that is in a symbol that is not a GAP and that does not carry a sequence does not transmit all-0 bit information or transmit random bit information, but carries useful data. For example, the useful data is the sensing result (For manners of encoding, modulation, and resource mapping, refer to a transmission manner of a physical sidelink shared channel (PSSCH) in section 8.3.1 of 3GPP TS38.211 v16.2.0 and section 8.2 of TS38.212 v16.2.0).

(2) The sensing signal in Format 3 is used as a DMRS in Format 5.

Formats 6 and 7 may be used for sending, by the reader, the sensing signal and information indicating the resource for communication between the reader and the tag in FIG. 18. Format 6 is similar to Format 4, and Format 7 is similar to Format 5. A difference lies in that DMRSs in Format 6 and Format 7 are also used as sensing signals. The useful data is information indicating a resource for communication with the tag.

The first information may be sent by using one piece of information or a message. Alternatively, the first information may be sent by using a plurality of pieces of signaling or messages. For example, a plurality of fields of the first information may be sent by using the plurality of pieces of signaling. The second information is similar. Details are not described again.

The descriptions in the foregoing embodiments, for example, the features described in FIG. 6 to FIG. 18, may be mutually referenced unless otherwise specified.

Figure 19:
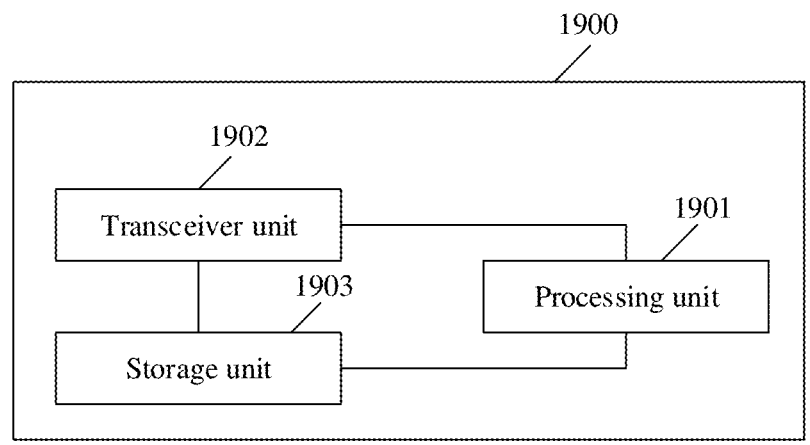
FIG. 19 is a schematic diagram of a communication apparatus according to an embodiment.
Figure 20:
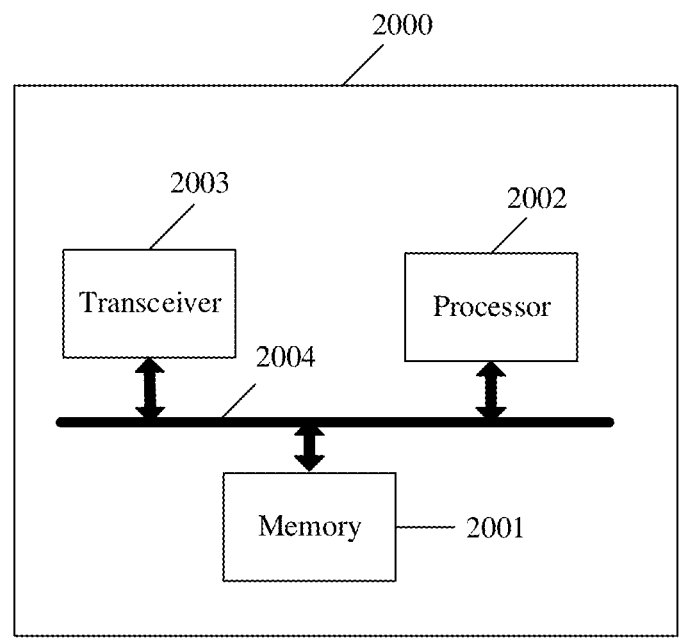
FIG. 20 is a schematic diagram of another communication apparatus according to an embodiment.

FIG. 19 and FIG. 20 are schematic diagrams of structures of possible communication apparatuses according to an embodiment. These communication apparatuses can implement functions of the terminal device or the network device in the foregoing method embodiments, and therefore can also achieve effects of the foregoing method embodiments. In this embodiment, the communication apparatus may be the network device 110 shown in FIG. 2, may be the reader 120 shown in FIG. 2, or may be a unit (such as a chip) applied to the reader or the network device.

As shown in FIG. 19, the communication apparatus 1900 includes a processing unit 1901, a transceiver unit 1902, and a storage unit 1903. The communication apparatus 900 may be configured to implement functions of the terminal device or the network device in the method embodiments shown in FIG. 6 to FIG. 16. The storage unit 1903 stores a program executed by the processing unit 1901. The transceiver unit 1902 is configured to send and receive a signal. The processing unit 1901 is configured to process the signal sent and received by the transceiver unit 1902, and control the transceiver unit 1902 to send and receive the signal.

When the communication apparatus 1900 is configured to implement functions of the reader in the method embodiments shown in FIG. 6 to FIG. 16, the transceiver unit 1902 is configured to receive first information from a first network device, where the first information indicates a first resource and a second resource. The transceiver unit 1902 is further configured to send a first sensing signal on the first resource, and receive a second sensing signal from a second device on the second resource. The processing unit 1901 is configured to determine a first sensing result based on the second sensing signal. The transceiver unit 1902 is further configured to send the first sensing result on a third resource, and receive second information on a fourth resource. The processing unit 1901 is further configured to determine a fifth resource based on the second information. The transceiver unit 1902 is configured to communicate with a tag on the fifth resource. The processing unit 1901 is further configured to control the transceiver unit 1902 to communicate with the tag on the fifth resource, and send and receive the signal.

When the communication apparatus 1900 is configured to implement functions of the network device in the method embodiments shown in FIG. 6 to FIG. 16, the transceiver unit 1902 is configured to send first information, where the first information indicates a first resource and a second resource. The first resource is used by a first device to send a first sensing signal, and the second resource is used by a second device to send a second sensing signal. The transceiver unit 1902 is further configured to receive, on a third resource, a first sensing result from the first device, and receive, on a sixth resource, a second sensing result from the second device. The processing unit 1901 is configured to determine second information based on the first sensing result and the second sensing result, where the second information indicates a fifth resource for communication between the first device and a tag. The transceiver unit 1902 is further configured to send the second information to the first device on a fourth resource. The processing unit 1901 is further configured to control the transceiver unit 1902 to send and receive the foregoing signal.

When the communication apparatus 1900 is configured to implement functions of the reader in the method embodiments shown in FIG. 6 to FIG. 16, the transceiver unit 1902 is configured to receive first information from a first network device, where the first information indicates a first resource and a second resource. The transceiver unit 1902 is further configured to send a second sensing signal on the second resource. The transceiver unit 1902 is further configured to receive, on the first resource, a first sensing signal from a reader 1. The processing unit 1901 is configured to determine a second sensing result based on the first sensing signal. The transceiver unit 1902 is further configured to receive second information on a sixth resource, where the second information indicates a fifth resource for communication between the reader 1 and a tag. The processing unit 1901 determines, based on the second sensing result and the second information, a seventh resource for communicating with the tag. The transceiver unit 1902 is further configured to send information indicating the seventh resource, and communicate with the tag on the seventh resource.

When the communication apparatus 1900 is configured to implement functions of the reader in the method embodiments shown in FIG. 6 to FIG. 16, the transceiver unit 1902 is configured to receive first information from a first network device, where the first information indicates a first resource and a second resource. The transceiver unit 1902 is further configured to send a first sensing signal on the first resource. The transceiver unit 1902 is further configured to receive, on the first resource, the first sensing signal and second information from a reader 1, where the second information indicates a fifth resource for communication between the reader 1 and a tag. The processing unit 1901 is configured to determine a second sensing result based on the first sensing signal. The processing unit 1901 is further configured to determine, based on the second sensing result and the second information, a seventh resource for communicating with the tag. The transceiver unit 1902 is further configured to send, on the second resource, the second sensing signal and information indicating the seventh resource. The transceiver unit 1902 is further configured to communicate with the tag on the seventh resource.

For more detailed descriptions of the transceiver unit 1901 and the processing unit 1902, refer to related descriptions in the foregoing method embodiments. Details are not described herein again.

As shown in FIG. 20, the communication apparatus 2000 includes a processor 2002, a transceiver 2003, a memory 2001, and a bus 2004. The transceiver 2003, the processor 2002, and the memory 2001 are connected to each other through the bus 2004. The bus 2004 may be a PCI bus, an EISA bus, or the like. The bus may be classified into an address bus, a data bus, a control bus, and the like. For ease of representation, only one bold line represents the bus in FIG. 20, but this does not mean that there is only one bus or only one type of bus. The memory 2001 stores a program executed by the processor 2002. The transceiver 2003 is configured to send and receive a signal. The processor 2002 is configured to process the signal sent and received by the transceiver 2003, and control the transceiver 2003 to send and receive the signal.

When the communication apparatus 2000 is the network device in the method embodiments in FIG. 6 to FIG. 16, the transceiver 2003 is configured to: send information (first information) indicating a resource on which a reader sends a sensing signal, receive a sensing result sent by the reader, and send information (second information) indicating a resource for communication between the reader and a tag. The processor 2002 is configured to determine, based on the received sensing result of the reader, the resource for communication between the reader and the tag. For details, refer to the embodiments of FIG. 6 to FIG. 16. Details are not described again. Actually, the processor 2002 is configured to perform functions of the processing unit 1901, the transceiver 2003 is configured to perform functions of the transceiver unit 1902, and the memory 2001 is configured to perform functions of the storage unit 1903.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that, the processor in embodiments may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in the embodiments may be implemented in a hardware manner or may be implemented in a manner of executing software instructions by a processor. The software instructions may include a corresponding software module. The software module may be stored in a random access memory (RAM), a flash memory, a read-only memory (ROM), a programmable read-only memory (PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium known in the art. For example, a storage medium is coupled to a processor, so that the processor can read information from the storage medium or write information into the storage medium. Further, the storage medium may be a component of the processor. The processor and the storage medium may be located in an ASIC. In addition, the ASIC may be located in an access network device or a terminal device. Additionally, the processor and the storage medium may alternatively exist in the access network device or the terminal device as discrete components.

All or a part of the foregoing embodiments may be implemented by software, hardware, firmware, or any combination thereof. When software is used to implement embodiments, all or a part of the embodiments may be implemented in a form of a computer program product. The computer program product includes one or more computer programs and instructions. When the computer programs or instructions are loaded and executed on a computer, all or a part of the procedures or functions in embodiments are executed. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape. The usable medium may also be an optical medium, for example, a DVD. The usable medium may also be a semiconductor medium, for example, a solid-state disk (, SSD).

In various embodiments, unless otherwise stated or there is a logic conflict, terms and/or descriptions in different embodiments are consistent and may be mutually referenced, and features in different embodiments may be combined based on an internal logical relationship thereof, to form a new embodiment.

In the embodiments, at least one means one or more, and a plurality of means two or more. The term "and/or" is an association relationship for describing associated objects and represents that three relationships may exist. For example, A and/or B may represent the following three cases: A only exists, both A and B exist, and B only exists, where A and B may be singular or plural. In the embodiments, the character "/" generally indicates that the associated objects are in an "or" relationship.

It may be understood that numerical symbols involved in embodiments are differentiated merely for ease of description but are not used to limit the scope of the embodiments. Sequence numbers of the foregoing processes do not mean an execution sequence. The execution sequence of the processes should be determined based on their functions and internal logic.

What is claimed is:

1. A sensing method performed by a first device, comprising:
   receiving first information from a first network device, wherein the first information indicates a first resource and a second resource;
   sending a first sensing signal on the first resource;
   receiving a second sensing signal from a second device on the second resource;
   determining a first sensing result based on the second sensing signal;
   sending the first sensing result on a third resource;
   receiving second information on a fourth resource, wherein the second information comprises a second sensing result of the second device;
   determining a fifth resource based on the second information;
   communicating with a tag on the fifth resource; and
   sequentially determining resources of readers in descending order based on the first sensing result, the second sensing result, and priorities of the readers.

2. The method according to claim 1, wherein sending the first sensing result further comprises:
   sending the first sensing result to the first network device, and receiving the second information further comprises:
   receiving the second information from the first network device, wherein the second information indicates the fifth resource.

3. The method according to claim 1, wherein the third resource is associated with the first resource.

4. The method according to claim 1, wherein the first information indicates at least one of:
   a start location of a first resource set, wherein the first resource set comprises the first resource and the second resource;
   a quantity of resource elements comprised in the first resource set,
   an index of the first resource in the first resource set, or
   an index of the second resource in the first resource set.

5. The method according to claim 1, wherein the fifth resource belongs to a second resource set; and the second information indicates at least one of:
   a start location of the second resource set,
   a quantity of resource elements comprised in the second resource set, or
   an index of the fifth resource in the second resource set.

6. The method according to claim 1, wherein sending the first sensing result further comprises:
   sending the first sensing result to the second device, and receiving the second information further comprises:
   receiving the second information from the second device.

7. A sensing method performed by a first network device, comprising:
   sending first information, wherein the first information indicates a first resource and a second resource, the first resource is used by a first device to send a first sensing signal, and the second resource is used by a second device to send a second sensing signal;
   receiving, on a third resource, a first sensing result from the first device;
   receiving, on a sixth resource, a second sensing result from the second device;
   determining second information based on the first sensing result and the second sensing result, wherein the second information comprises a second sensing result of the second device and indicates a fifth resource for communication between the first device and a tag;
   sending the second information to the first device on a fourth resource; and
   sequentially determining resources of readers in descending order based on the first sensing result, the second sensing result, and priorities of the readers.

8. The method according to claim 7, wherein the third resource is associated with the first resource.

9. The method according to claim 7, wherein the first information indicates at least one of:
   a start location of a first resource set, wherein the first resource set comprises the first resource and the second resource,
   a quantity of resource elements comprised in the first resource set, an index of the first resource in the first resource set, or an index of the second resource in the first resource set.

10. The method according to claim 7, wherein the fifth resource belongs to a second resource set; and the second information indicates at least one of:
 a start location of the second resource set,
 a quantity of resource elements comprised in the second resource set, or
 an index of the fifth resource in the second resource set.

11. A communication apparatus, comprising a processor coupled to a memory, the memory stores instructions; and when the instructions are executed by the processor, the communication apparatus is enabled to perform the steps of:
 receiving first information from a first network device, wherein the first information indicates a first resource and a second resource;
 sending a first sensing signal on the first resource;
 receiving a second sensing signal from a second device on the second resource;
 determining a first sensing result based on the second sensing signal;
 sending the first sensing result on a third resource;
 receiving second information on a fourth resource, wherein the second information comprises a second sensing result of the second device;
 determining a fifth resource based on the second information;
 communicating with a tag on the fifth resource; and
 sequentially determining resources of readers in descending order based on the first sensing result, the second sensing result, and priorities of the readers.

12. The communication apparatus according to claim 11, wherein sending the first sensing result further comprises:
 sending the first sensing result to the first network device, and receiving the second information further comprises:
 receiving the second information from the first network device, wherein the second information indicates the fifth resource.

13. The communication apparatus according to claim 11, wherein the third resource is associated with the first resource.

14. The communication apparatus according to claim 11, wherein the first information indicates at least one of:
 a start location of a first resource set, wherein the first resource set comprises the first resource and the second resource;
 a quantity of resource elements comprised in the first resource set,
 an index of the first resource in the first resource set, or
 an index of the second resource in the first resource set.

15. The communication apparatus according to claim 11, wherein the fifth resource belongs to a second resource set; and the second information indicates at least one of:
 a start location of the second resource set,
 a quantity of resource elements comprised in the second resource set, or
 an index of the fifth resource in the second resource set.

16. The communication apparatus according to claim 11, wherein sending the first sensing result further comprises:
 sending the first sensing result to the second device, and receiving the second information further comprises:
 receiving the second information from the second device.

17. A communication apparatus, comprising a processor and a memory, wherein the memory stores instructions; and when the instructions are executed by the processor, a network device is enabled to perform the steps of:
 sending first information, wherein the first information indicates a first resource and a second resource, the first resource is used by a first device to send a first sensing signal, and the second resource is used by a second device to send a second sensing signal;
 receiving, on a third resource, a first sensing result from the first device;
 receiving, on a sixth resource, a second sensing result from the second device;
 determining second information based on the first sensing result and the second sensing result, wherein the second information comprises a second sensing result of the second device and indicates a fifth resource for communication between the first device and a tag;
 sending the second information to the first device on a fourth resource; and
 sequentially determining resources of readers in descending order based on the first sensing result, the second sensing result, and priorities of the readers.

18. The communication apparatus according to claim 17, wherein the third resource is associated with the first resource.

19. The communication apparatus according to claim 17, wherein the first information indicates at least one of:
 a start location of a first resource set, wherein the first resource set comprises the first resource and the second resource,
 a quantity of resource elements comprised in the first resource set,
 an index of the first resource in the first resource set, or
 an index of the second resource in the first resource set.

20. The method according to claim 17, wherein the fifth resource belongs to a second resource set; and the second information indicates at least one of:
 a start location of the second resource set,
 a quantity of resource elements comprised in the second resource set, or
 an index of the fifth resource in the second resource set.

* * * * *